(12) United States Patent
Mitsuishi et al.

(10) Patent No.: US 10,049,063 B2
(45) Date of Patent: Aug. 14, 2018

(54) SEMICONDUCTOR APPARATUS

(71) Applicant: Renesas Electronics Corporation, Kawasaki-shi, Kanagawa (JP)

(72) Inventors: Naoki Mitsuishi, Kanagawa (JP); Seiji Ikari, Tokyo (JP); Katsumasa Uchiyama, Kanagawa (JP)

(73) Assignee: Renesas Electronics Corporation, Tokyo ( * ) Notice: Subject to any disclaimer, the term of this patent is extended or adjusted under 35 U.S.C. 154(b) by 549 days.

(21) Appl. No.: 14/586,926

(22) Filed: Dec. 30, 2014

(65) Prior Publication Data

US 2015/0193367 A1 Jul. 9, 2015

(30) Foreign Application Priority Data

Jan. 7, 2014 (JP) .................................. 2014-001105

(51) Int. Cl.
*G06F 12/02* (2006.01)
*G06F 13/32* (2006.01)
*G06F 12/1081* (2016.01)
*G06F 13/28* (2006.01)

(52) U.S. Cl.
CPC .......... *G06F 13/32* (2013.01); *G06F 12/1081* (2013.01); *G06F 13/28* (2013.01); *G06F 2213/2406* (2013.01); *G06F 2213/2802* (2013.01); *Y02B 60/1228* (2013.01); *Y02D 10/14* (2018.01)

(58) Field of Classification Search
None
See application file for complete search history.

(56) References Cited

U.S. PATENT DOCUMENTS 5,371,865 A * 12/1994 Aikawa ................... G06F 9/383
  711/125
5,809,259 A * 9/1998 Mitsuishi ............ G06F 9/30043
  710/100
6,370,601 B1 * 4/2002 Baxter ....................... G06F 3/14
  710/22

(Continued)

FOREIGN PATENT DOCUMENTS

JP  01-125644 A  5/1989
JP  05-307516 A  11/1993
JP  07-129537 A  5/1995

(Continued)

OTHER PUBLICATIONS

Office Action dated Jul. 18, 2017, in Japanese Patent Application No. 2014-001105.

*Primary Examiner* — Ilwoo Park
(74) *Attorney, Agent, or Firm* — Shapiro, Gaber and Rosenberger, PLLC

(57) ABSTRACT

An object is to obtain output data corresponding to input data by referring to table data by a semiconductor apparatus having a simple configuration. An MCU includes a DTC for transferring data from a source address region to a destination address region based on data transfer information in response to a startup request. The DTC performs an operation on second source address information based on data that has been read from first source address information, performs reading based on a result of the operation, and writes read data based on destination address information.

12 Claims, 21 Drawing Sheets

(56) References Cited

U.S. PATENT DOCUMENTS

| | | | | |
|---|---|---|---|---|
| 6,785,743 B1* | 8/2004 | Sun | ........................ | G06F 9/345 |
| | | | | 710/22 |
| 2002/0026551 A1* | 2/2002 | Kamimaki | .............. | G06F 13/28 |
| | | | | 710/260 |

FOREIGN PATENT DOCUMENTS

| JP | 2000-194647 A | 7/2000 |
|---|---|---|
| JP | 2003-167726 A | 6/2003 |
| JP | 2012-014436 A | 1/2012 |

* cited by examiner

| BIT | MR | DR | SAR1 | SAR2 | DAR | CR |
|---|---|---|---|---|---|---|
| 0 | NXTE[0] | | | | | TCRL |
| | NXTE[1] | | | | | |
| | CRE | | | | | |
| | DRE | | | | | |
| | – | | | | | |
| | – | | | | | |
| | Sz[0] | | | | | |
| | Sz[1] | | | | | |
| | – | | | | | |
| | DIR | | | | | |
| | TDM[0] | | | | | TCRH |
| | TDM[1] | | | | | |
| | DM[0] | | | | | |
| | DM[1] | | | | | |
| | SM[0] | | | | | |
| 15 | SM[1] | | | | | |
| 16 | ISz[0] | | | | | |
| | ISz[1] | | | | | |
| | S1M[0] | | | | | |
| | S1M[1] | | | | | |
| | SF[0] | | | | | |
| | SF[1] | | | | | |
| | SF[2] | | | | | |
| | NOP | | | | | BTCR |
| | AEM | | | | | |
| | BRM | | | | | |
| | INM | | | | | |
| | DRM | | | | | |
| | PRM | | | | | |
| | OFM | | | | | |
| | SFM | | | | | |
| 31 | TLU | | | | | |

Fig. 2

SEMICONDUCTOR APPARATUS

CROSS-REFERENCE TO RELATED APPLICATIONS

This application is based upon and claims the benefit of priority from Japanese patent application No. 2014-001105, filed on Jan. 7, 2014, the disclosure of which is incorporated herein in its entirety by reference.

BACKGROUND

The present invention relates to a semiconductor apparatus, and for example, to a microcomputer.

In general, in a single-chip microcomputer, functional blocks such as a ROM (Read Only Memory) for holding programs, a RAM (Random Access Memory) for holding data, and an input/output circuit for inputting and outputting data or signals are formed on a single semiconductor substrate centering around a CPU (Central Processing Unit). Such single-chip microcomputers are used in various device control.

In device control of the single-chip microcomputer, there is a request for a data transfer in response to an event such as an interruption. Although a CPU can realize arbitrary processing by a combination of instructions, in order to perform interruption processing, it is necessary to execute exception processing, evacuation and recover processing of a stack, and a return instruction in order to switch a flow of processing. In such a case, an operation time of the CPU for reading instructions at the time of the data transfer tends to be long.

In order to solve the above-mentioned problem of a data transfer, there is a technique (Japanese Unexamined Patent Application Publication No. H01-125644) in which a data transfer controller is provided in a single-chip microcomputer, and a data transfer is performed by a small amount of hardware in response to requests from a number of peripheral processing apparatuses (input/output circuits). In this technique, a storage device (RAM) stores data transfer information such as a source address indicating a location in a memory in which data which should be transferred is stored. This technique further provides a vector table that stores an address indicating a location in the storage device (RAM) where all information necessary for the data transfer is stored. Further, means for referring to a content of the vector table in response to a startup request for the data transfer, and means for obtaining all the information necessary for the data transfer from the content of the vector table are provided. Although this technique achieves the data transfer by a small amount of hardware, a content of the data transfer is not taken into account.

Meanwhile, there is a technique (Japanese Unexamined Patent Application Publication No. 5-307516) in which different types of data transfer are performed according to a mode of the data transfer in order to extend an application range of the data transfer in a data transfer controller. This technique suggests a repeat transfer mode and a block transfer mode as the mode of the data transfer. This technique enables control on source and destination addresses and a selection of the number of transfers. For example, when this technique is applied to a system such as a printer, it is possible to control a stepper motor and control print data in the printer. Further, this technique is preferable for accumulating received data in a memory. As this technique holds data transfer information in dedicated hardware inside the data transfer controller and enables a selection of a configuration of the transfer information in a short address mode or a full address mode in order to effectively use the hardware. In this example, in the stepper motor, an amount of movement is proportional to a rotation angle, thus no feedback is necessary, and the stepping motor may only transfer a predetermined number of pieces of data in a predetermined order. In this technique, one of the source address and the destination address will be at, for example, a RAM, however it is not supposed to use the RAM while updating a memory content of the RAM.

There is another technique (Japanese Unexamined Patent Application Publication No. 7-129537) in which information necessary for a data transfer is stored in a storage device, and one operation of a data transfer controller can specify a data transfer of at least one piece of information (a chain transfer or a chain operation). This technique can be applied to various usages as arbitrary number of transfers are enabled by an arbitrary startup cause. It is eventually possible to improve flexibility of the system configuration, thereby improving the usability.

There is another technique (Japanese Unexamined Patent Application Publication No. 2000-194647) in which an arithmetic logic unit capable of performing a comparison between data that is set inside a data transfer controller in advance and data to be transferred and capable of performing a simple calculation is included inside a data transfer controller. In this technique, as the data transfer controller, which is dedicated hardware, performs the data transfer, data transfer that is faster than a CPU can be achieved. It is thus possible to reduce the number of times of interruption processing in the CPU, thereby improving the efficiency of the processing.

SUMMARY

However, the present inventors have found out the following problem in the above-mentioned techniques. In recent years, as functions included in and units to be controlled by a microcomputer have been increasing, control by the microcomputer has been requested to improve its accuracy. For example, although it is requested to output data corresponding to input data, if dedicated hardware is provided for every type of input data, a physical size of the microcomputer increases. This further complicates the configuration of the microcomputer and increases a processing time for obtaining the output data.

Other issues and new features will be apparent from the description of the specification of the present invention and attached drawings.

An aspect of the present invention is a semiconductor apparatus that includes: a data transfer controller for transferring data from a source address region to a destination address region based on data transfer information in response to a startup request. The data transfer controller performs a calculation on second source address information based on data that has been read from first source address information, performs reading based on a result of the calculation, and writes read data based on destination address information.

According to the above aspect, the semiconductor apparatus with a simple configuration can obtain output data corresponding to input data by referring to table data.

BRIEF DESCRIPTION OF THE DRAWINGS

The above and other aspects, advantages and features will be more apparent from the following description of certain embodiments taken in conjunction with the accompanying drawings, in which:

FIG. 2 is a diagram showing a configuration of data transfer information;

DETAILED DESCRIPTION

Figure 1A:
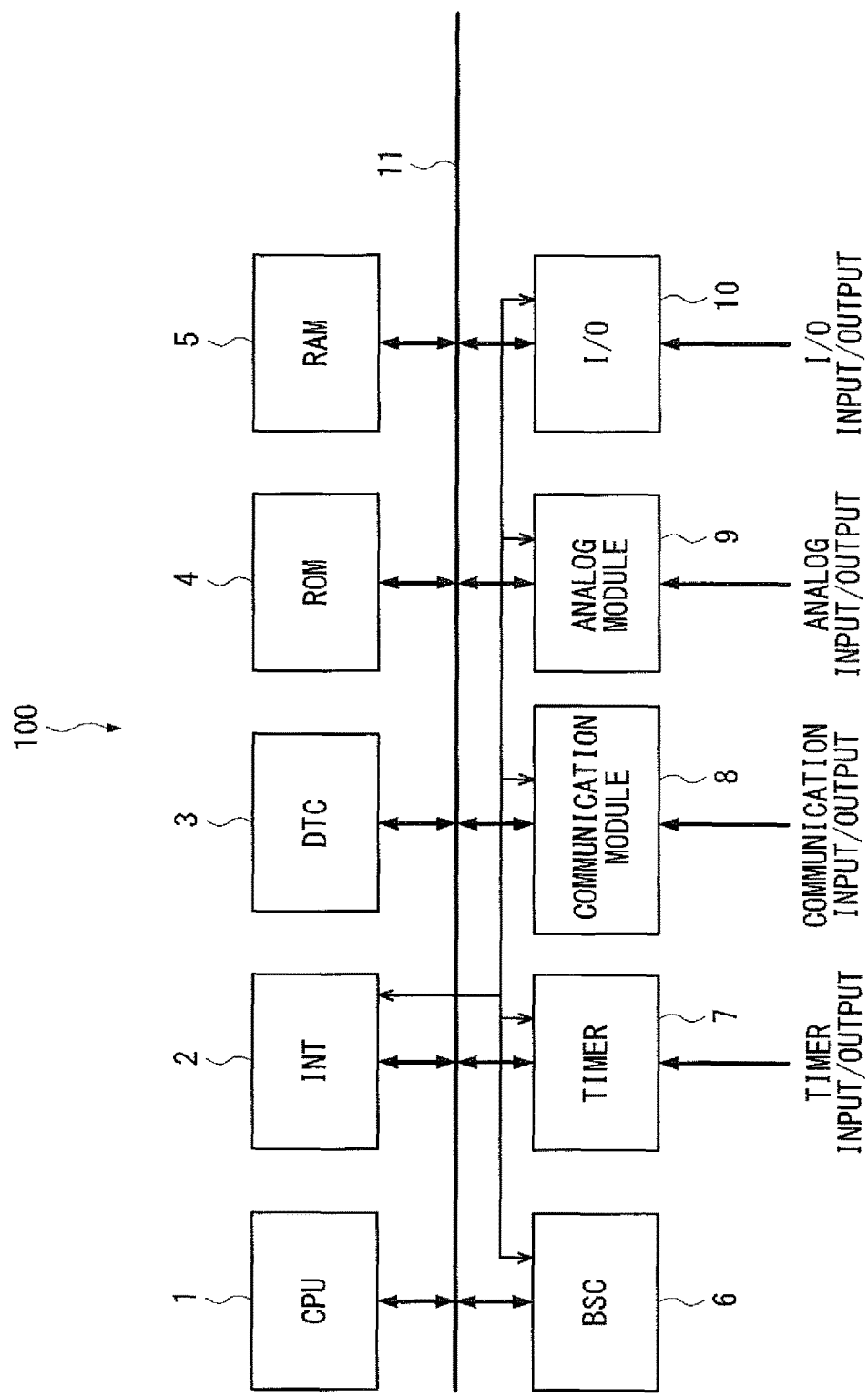
FIG. 1A is a block diagram schematically showing a configuration of a microcomputer according to a first embodiment.

Hereinafter, embodiments of the present invention shall be explained with reference to the drawings. The same components are denoted by the same reference numerals throughout the drawings, and a repeated explanation shall be omitted as necessary.

First Embodiment

Figure 1B:
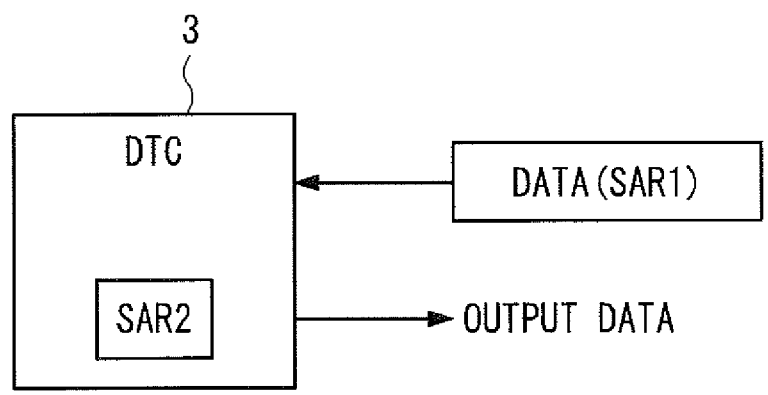
FIG. 1B is a diagram showing a basic data flow of a Data Transfer Controller (DTC)

A microcomputer 100, which is a semiconductor apparatus according to a first embodiment, shall be explained. FIG. 1A is a block diagram schematically showing a configuration of the microcomputer 100 according to the first embodiment. FIG. 1B shows a basic data flow of a Data Transfer Controller (DTC) that is included in the microcomputer 100. Hereinafter, the configuration of the microcomputer 100 shall be explained with reference to FIG. 1A. Note that the microcomputer shall be abbreviated as MCU (Micro Controller Unit).

The MCU 100 includes a Central Processing Unit (CPU) 1, an Interrupt Controller (hereinafter referred to as an INT) 2, a Data Transfer Controller (hereinafter referred to as a DTC) 3, a Read Only Memory (ROM) 4, a Random Access Memory (RAM) 5, a Bus Controller (hereinafter referred to as a BSC) 6, a timer 7, a communication module 8, an analog module 9, an input/output port (I/O) 10, an internal bus 11 and the like. As the communication module 8, for example, a serial communication interface is provided. As the analog module 9, for example, an analog-to-digital (A/D) converter or a digital-to-analog (D/A) converter is provided.

In the MCU 100, the CPU 1 will be a subject of the operation. The CPU 1 reads instructions mainly from the ROM 4 and operates. The DTC 3 transfers data on behalf of the CPU 1 based on the setting of the CPU 1.

In response to an interrupt request from the timer 7, the communication module 8, the analog module 9 or the like and an interrupt request from the I/O 10 based on a plurality of external request signals from outside the MCU 1, the INT 2 outputs an interrupt request or a data transfer request to the CPU 1 or the DTC 3. Further, when processing by the interrupt request signal is started or completed, the INT 2 outputs an interruption clear signal, which is a signal for clearing the interruption, corresponding to the interrupt signals or interrupt cause flags of the timer 7, the communication module 8, the analog module 9, and the I/O 10, respectively.

The BSC 6 receives a bus request signal from the CPU 1 and the DTC 3, arbitrates occupation of the internal bus 11, and outputs a bus usage permission signal. The BSC 6 interfaces to the CPU 1 and the DTC 3 for a bus request, a bus acknowledgement, a bus command, a wait, an address, and data and realizes reading from or writing in the RAM, other functional blocks, and modules that are connected to the internal bus 11.

As described above, the DTC 3 performs a data transfer based on the data transfer information. FIG. 2 shows a configuration of the data transfer information. The data transfer information is composed of a mode register (also referred to as an MR), a first source address register (also referred to as an SAR1), a second source address register (also referred to as an SAR2), a destination address register (also referred to as a DAR), a data register (also referred to as a DR), and a transfer count register (also referred to as a CR).

The MR specifies a mode of the data transfer which will be performed by the DTC 3. The DTC 3 uses necessary data among the DR, the SAR1 the SAR2, the DAR, and the CR according to the mode of the data specified by the MR.

The CR is divided into a block transfer count register (also referred to as a BTCR) and a transfer count register (also referred to as a TCR). The TCR is divided into 8-bit TCRH and 8-bit TCRL.

As for these registers, one set of circuits are disposed inside the DTC 3 and do not exist in an address space of the CPU 1, although not especially limited thereto. As for the data transfer information which should be stored in these registers, necessary number of sets are disposed in a predetermined data transfer information disposed region such as the RAM 5 in the address space of the CPU 1.

Next, a bit configuration of the MR shall be explained. The bits 31 to 16 of the MR set the data transfer mode and specify input data of the data transfer function for a table reference. The bits 15 to 0 of the MR specify a table reference of the data transfer function for a table reference and specify a data transfer of a normal data transfer function. At this time, in the table, a plurality of pieces of data or parameters are arranged in a predetermined order in the address space.

The bit 31 of the MR is a TLU bit and selects whether or not to execute a table reference in a data transfer. When the TLU bit is cleared to "0", no table reference is executed. The data transfer information at this time changes according to a value of the DRE bit, which will be explained later. When the TLU bit is "1" and the DRE bit is cleared to "0", the data transfer information will have the MR, the SRA2, the DAR, and the CR, which are 128 bits (32 bits×4). When the TLU bit is set to "1" and the DRE bit is set to "1", the data transfer information will have the MR, the DR, the SAR2, the DAR, and the CR, which are 160 bits (32 bits×5).

When the TLU bit is "1", the table reference is executed. At this time, a table reference mode is specified based on an SRM bit, an OFM bit, a PRM bit, a DRM bit, an INM bit, a BRM bit, an AEM bit, and an NOP bit, which will be explained later. The table reference mode shall be explained later.

The bits 30 to 23 of the MR are the SRM bit, the OFM bit, the PRM bit, the DRM bit, the INM bit, the BRM bit, the AEM bit, and the NOP bit, respectively. These bits are information for specifying the table reference mode to execute a table reference.

When the SRM bit is "1", the table reference mode will be a shift mode. When the OFM bit is "1", the table reference mode will be an offset mode. When the PRM bit is "1", the table reference mode will be a proportional mode. When the DRM bit is "1", the table reference mode will be a differential mode. When the INM bit is "1", the table reference mode will be an integral mode. When the BRM bit is "1", the table reference mode will be a branch mode. When the AEM bit is "1", the table reference mode will be an address calculation mode. When the NOP bit is "1", the table reference mode will be a no-operation mode.

In the shift mode, the data transfer information changes according to the value of the CRE bit, which will be explained later. When the CRE bit is set to "1", the data transfer information will have the MR, the SAR1, the SAR2, the DAR, and the CR, which are 160 bits (32 bits×5). When the CRE bit is cleared to "0", the data transfer information will have the MR, the SAR1, the SAR2, and the DAR, which are 128 bits (32 bits×4).

In the offset mode, the proportion mode, and the differential mode, the data transfer information changes according to the value of the CRE bit, which will be explained later. When the CRE bit is set to "1", the data transfer information will have the MR, the DR, the DAR1, the SAR2, the DAR, and the CR, which are 192 bits (32 bits×6). When the CRE bit is cleared to "0", the data transfer information will have the MR, the DR, the SAR1, the SAR2, and the DAR, which are 160 bits (32 bits×5).

In the integral mode and the address calculation mode, the data transfer information will have the MR, the SAR1, the SAR2, the DAR, and the CR, which are 160 bits (32 bits×5)

In the branch mode, the data transfer information will have the MR, the SAR1, and the SAR2, which are 96 bits (32 bits×3).

In the no-operation mode, the data transfer information will have only the MR, which is 32 bits (32 bits×1).

Note that details of the data transfer in the respective table reference modes shall be explained later.

The bits 22 to 20 are SF[2:0] bits and specify a shift of the input data by +3 to −3 bits. When it is +, a left arithmetic shift is performed, while when it is −, a right arithmetic shift is performed.

The bits 19 and 18 are S1M[1:0] bits and specify whether to increment, decrement or fix the SAR1 after the data transfer.

The bits 17 and 16 are ISz[1:0] bits and select whether reading of the input data is performed by a byte size, a word size, or a long word size.

The bits 15 and 14 of the MR are SM[1:0] bits and specify whether to increment, decrement or fix the SAR2 after the data transfer.

The bits 13 and 12 of the MR are DM[1:0] bits and specify whether to increment, decrement or fix the DAR after the data transfer.

The bits 11 and 10 are TMD[1:0] bits and specify the transfer mode of data. When TMD[1:0] bit is "00", the transfer mode will be a normal mode. When the TMD[1:0] is "01", the transfer mode will be a repeat mode. The TMD[1:0] bit is "10", the transfer mode will be a block transfer mode. When the TMD[1:0] bit is "11", the transfer mode will be a block addition mode. Details of the respective transfer modes shall be explained later.

The bit 9 of the MR is the DIR bit and specifies whether either of the source or the destination to be a repeat region or a block region.

The bits 7 and 6 of the MR are Sz[1:0] bits and specify whether one data transfer is performed by a byte size, a word size, or a long word size.

The bit 3 is the DRE bit. When the DRE bit is cleared to "0", the DR is not used, and the read data is written. When the DRE bit is set to "1", the DR is used, and read data from which a content of the DR has been subtracted is written.

The bit 2 is the CRE bit. When the CRE bit is cleared to "0", an operation of the DTC is performed unlimitedly in response to a startup request signal. At this time, when the transfer is the normal mode, the CR is not used. When the CRE bit is set to "1", the DTC 3 operates according to the value that is initially set to the CR.

The bit 1 of the MR is an NXTE1 bit and specifies whether to end a data transfer or perform a next data transfer for one startup cause. When the NXTE1 bit is cleared to "0", after reading the data transfer information or transferring data, the data transfer information is written, and the operation of the DTC 3 is ended. When the NXTE1 bit is set to "1", after reading the data transfer information or transferring data, the data transfer information is written. Further, the data transfer information is read from consecutive addresses. Then, after the data transfer that is specified by this data transfer information is performed, the data transfer information is written. An operation of performing a series of processing, which is writing the data transfer information, performing a data transfer, and writing the data transfer information, for a plurality of times, in the above-described manner shall be referred to as a chain operation. The bit 0 of the MR is an NXTE0 bit and specifies whether to perform the chain operation when the CR becomes "0".

Figure 3:
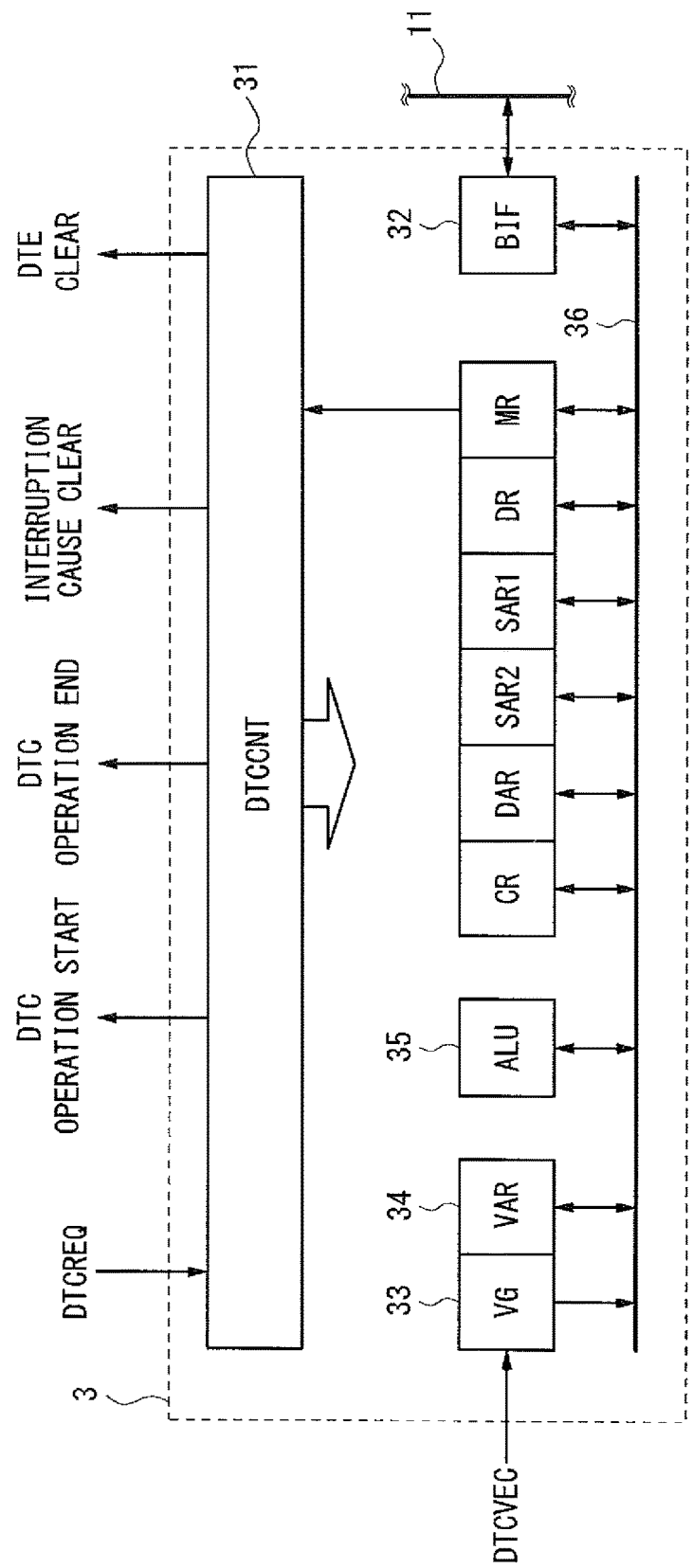
FIG. 3 is a block diagram schematically showing a configuration of the Data Transfer Controller (DTC)

A configuration of the DTC 3 shall be explained. FIG. 3 is a block diagram schematically showing the configuration of the DTC 3. The DTC 3 includes a data transfer control block (also referred to as a DTCCNT) 31, a bus interface (also referred to as a BIF) 32, a vector generation block (also referred to a VG) 33, a vector address register (also referred to as a VAR) 34, the MR, the SAR1, the SAR2, the DAR, the CR, the DR, an arithmetic logic unit (also referred to as ALU) 35, and an internal bus 36.

The DTCCNT 31 controls the DTC 3 based on a startup request signal DCTREQ from the INT2 and the content of MR.

The BIF 32 interfaces to the internal bus 36 of the DTC 3 and the internal bus 11 of the MCU 1. This interface includes a bus request, a bus acknowledgement, a bus command, a wait, an address, and data.

The VG 33 generates a vector address according to a vector number DTCVEC that is provided by the INT 2. The vector number DTCVEC may be, for example, quadrupled, and a predetermined offset is added thereto.

A VAR 34 stores a first address of the data transfer information that is read from the vector address.

The MR, the SAR1, the SAR2, the DAR, and the CR store the data transfer information that is sequentially read from the first address of the data transfer information.

The ALU 35 has functions such as a logical operation, a shift, and an arithmetic operation and executes these operations in a predetermined order. Although not shown in the drawings, the internal bus 36 includes a plurality of buses and can provide contents of the SAR1, the SAR2, the DAR, the CR, and the DR to the ALU 35 via the plurality of buses. The ALU 35 can perform operations using the SAR1, the SAR2, the DAR, the CR, and the DR.

Normal Mode

When the TMD[1:0] bit is "00", the transfer mode will be the normal mode. In the normal mode, in one startup, one data transfer is performed from the source address indicated by the SAR to the destination address indicated by the DAR. After the data transfer is completed, the SAR is incremented, decremented, or fixed according to the SM[1:0] bit. The DAR is incremented, decremented, or fixed according to the DM[1:0] bit. After that, the TCR is decremented.

In the normal mode, the data transfer and a register operation that have been explained above are repeated for the number of times specified by the TCR every time the startup cause occurs.

After the operation is performed for the number of times specified by the CR, an interruption, which is the startup cause, is requested to the CPU.

Repeat Mode

When the TMD[1:0] bit is "01", the transfer mode will be the repeat mode. When the DIR bit is cleared to "0", the source address is set to a repeat region. When the DIR bit is set to "1", the destination address is set to the repeat region. In the repeat mode, the TCRH is used as a transfer count register, and the TCRL is used as a transfer number hold register. The size of the repeat region is specified by the TCRH. Before the data transfer is started, the same value is set to the TCRH and the TCRL as initial values.

In the repeat mode, in one startup, one data transfer is performed from the source address indicated by the SAR to the destination address indicated by the DAR. After the data transfer is completed, the SAR is incremented, decremented, or fixed according to the SM[1:0] bit. The DAR is incremented, decremented, or fixed according to the DM[1:0] bit. After that, the TCR (TCRH) is decremented. In the repeat mode, the data transfer and the register operation that have been explained above are repeated for the number of times specified by the TCR (the TCRH and the TCRL) every time the startup cause occurs.

When the data transfer for the specified number of times is completed, the TCRH will be "0". After that, a part or all of initial setting values of the SAR, the DAR, and the TCRH are recovered based on the content held in the TCRL.

When the TCRH becomes "0", the content of the TCRL is transferred to the TCRH of the transfer counter register. Then, the TCRH is recovered to the initial value. Further, the SAR or the DAR is recovered to the initial setting values by the following operation.

When the DIR bit is set to "1", an operation OP1 shown in Expression (1) is performed, and the SAR is recovered to the initial setting value.

[Expression 1]

$$OP1 = SAR + SM1 \cdot (-1)^{SM0} \cdot 2^{Sz} \cdot TCRL \tag{1}$$

When the DIR bit is cleared to "0", an operation OP2 shown in Expression (2) is performed, and the DAR is recovered to the initial setting value.

[Expression 2]

$$OP2 = DAR + DM1 \cdot (-1)^{DM0} \cdot 2^{Sz} \cdot TCRL \tag{2}$$

In order to perform the above operations, the content of the TCRL is input to the ALU 35 via the internal bus 36 for the SAR or the DAR that is specified as the repeat region. When the ALU 35 performs the operation shown in Expression (1) or (2), the SAR or the DAR is initialized.

Block Transfer Mode

When the TMD[1:0] bit is "10", the transfer mode will be the block transfer mode. When the DIR bit is cleared to "0", the source address is set to the block region. When the DIR bit is set to "1", the destination address is set to the block region. In the block transfer mode, the SAR is used as a source address specify register, the DAR is used as a destination address specify register, the TCRH is used as a block size count register, the TCRL is used as a block size hold register, and the BTCR is used as a block transfer count register.

In the block transfer mode, in one startup, a data transfer of a block size is performed from the source address indicated by the SAR to the destination address indicated by the DAR. The SAR is incremented, decremented, or fixed according to the SM[1:0] bit for every data transfer. The DAR is incremented, decremented or fixed according to the DM[1:0] bit. After that, the TCR (TCRH) is decremented.

When the data transfer for the specified number of times is completed, the TCRH will be "0". In this case, in a manner similar to the repeat mode, a part or all of initial setting values of the SAR, the DAR, and the TCRH are recovered based on the content held in the TCRL.

Further, when the data transfer of the block region is completed, the BTCH is decremented. In the block transfer mode, the data transfer of the block region that has been explained above is repeated for the number of times specified by the BTCR (until the BTCR decreases to "0") every time the startup case occurs.

Figure 4:
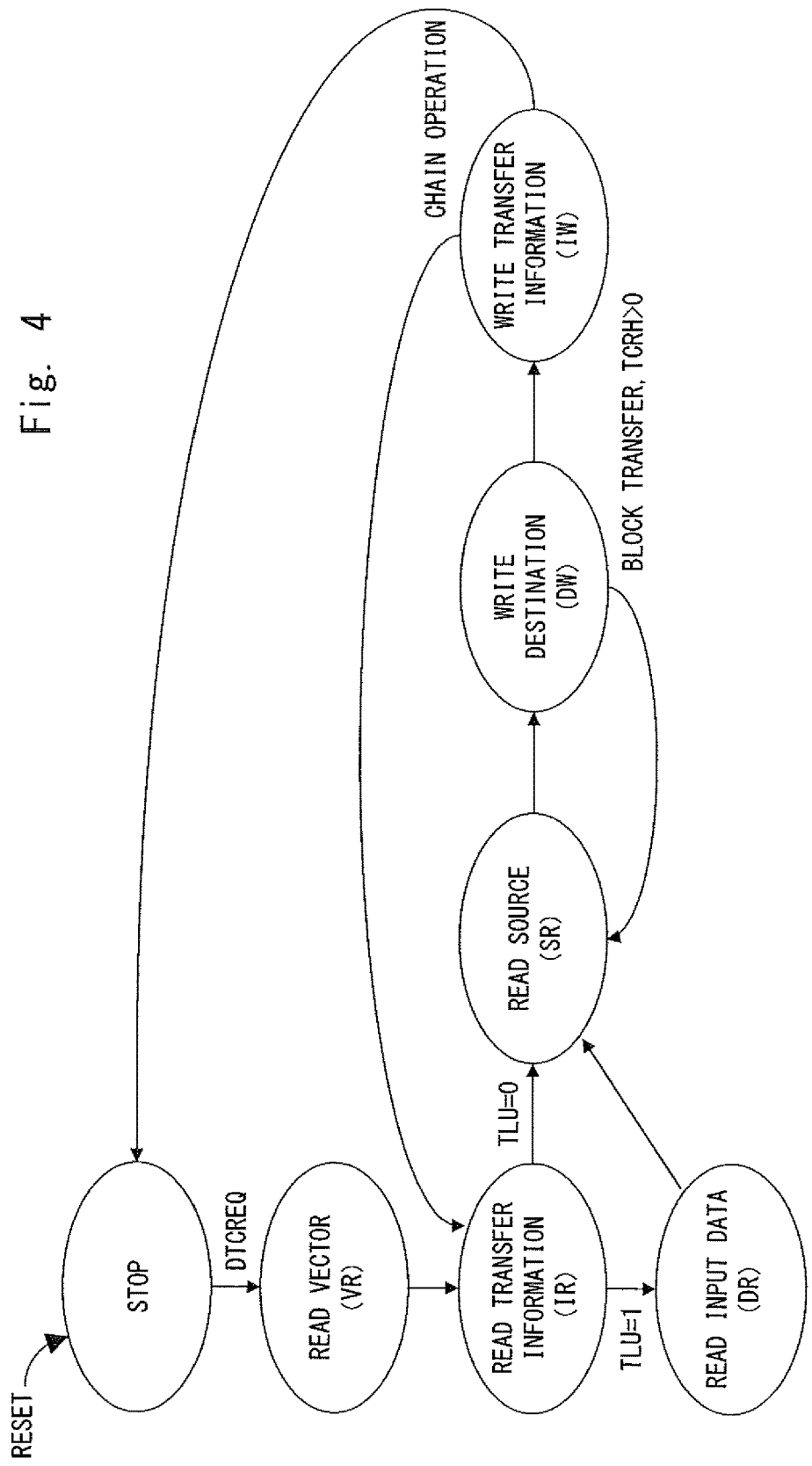
FIG. 4 is a diagram showing a state transition of the Data Transfer Controller (DTC)

FIG. 4 shows a state transition diagram of the DTC 3. The state transition shown in FIG. 4 is mainly implemented to the data transfer control block (DTCCNT) of the DTC 3.

When a startup request signal DTCREQ is provided from the INT 2, the DTC 3 transitions to a VR state. After the transition to the VR state, the DTC 3 reads a first address of the data transfer information that is stored in the vector region (the data transfer information first address disposed region) based on the vector address generated by the VG 33. The DTC 3 stores the read content in the VAR34.

Next, the DTC 3 transitions to an IR state. After the transition to the IR state, the DTC 3 reads the data transfer information that is stored in the data transfer information disposed region according to the first address that has been read in the VR state. At this time, the DTC 3 reads the MR, the DR, the SAR1, the SAR2, the DAR, and the CR.

When the TLU bit is cleared to "0", and the data transfer is performed in the normal mode, the DTC 3 transitions to an SR state, a DW state, and an IW state.

In the SR state, the DTC 3 reads the content of the source address according to the content of the SAR2. Further, the DTC 3, for example, increments the SAR2 according to the content of the MR.

In the DW state, the DTC 3 writes the read content in the destination address according to the content of the DAR. Further, the DTC 3 increments the DAR, decrements the CR or the like according to the content of the MR.

In the IW state, the DTC 3 writes back the MR, the SAR1, the SAR2, the DAR, and the CR in the data transfer information disposed region according to the content of the VAR34. However, in the IW state, it is possible not to write the registers that are not updated among the MR, the DR, the SAR, the DAR, and the CR. For example, when the DAR is fixed, the DAR is not written.

Note that when the DTC 3 performs the data transfer in the block transfer mode according to the content of the MR, the DTC 3 repeats the above-mentioned operations in the SR state and the DW state for the number of times specified by the TCR.

After that, when the chain operation is not performed, the DTC 3 clears the interrupt cause flag or the DTE bit, which has become the startup cause, completes the operation, and returns to a stopped state.

When the chain operation is performed, the DTC 3 returns to the IR state from the IW state and can perform another data transfer.

Meanwhile, when the TLU bit is cleared to "1" (when the table reference is performed), and the data transfer is performed in the normal mode, the DTC 3 transitions to the DR state from the IR state.

In the DR state, the DTC 3 reads the input data for a table reference. After that, as has been explained, the DTC 3 transitions to the SR state, DW state, and IW state. In the SR state, the DTC 3 refers to (reads) a necessary table based on the input data and the content of the SAR2. After that, the processing will be similar to the processing in the normal data transfer mode.

Figure 5:
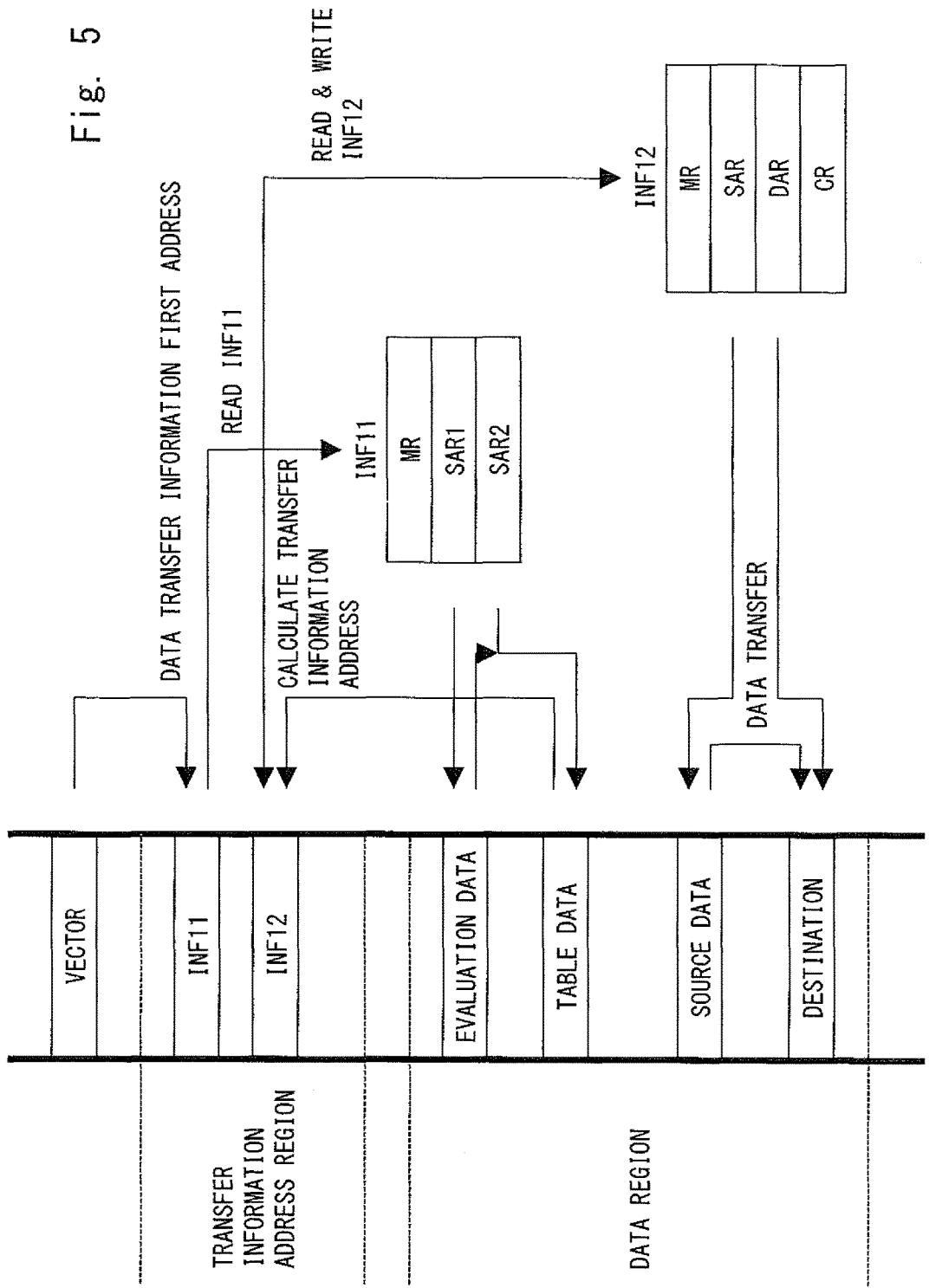
FIG. 5 is a diagram showing a data transfer in a branch mode.

In this embodiment, in the table reference mode, the branch mode is selected among the table reference modes, and an operation is performed. In the branch mode, when the TLU bit is "1" and the BRM bit is "1", the table reference mode will be the branch mode. FIG. 5 shows a data transfer in the branch mode.

The CPU 1 writes the necessary data transfer information in a predetermined transfer information address region. As table data, an offset of the first address of the data transfer information that will be executed following the operation by the data transfer information is prepared. In this state, when an interrupt cause occurs, and the DTC 3 is started, the data transfer information first address is read from the corresponding vector region (the VR state).

Data transfer information INF11 is read from the data transfer information disposed region based on the read address (the IR state). The data transfer information INF11 at this time will be the MR, the SAR1, and the SAR2.

Data of the data size specified by the ISz[1:0] bit is read from the address that is specified by the SAR1 (the DR state). The read data here shall be referred to as evaluation data. The evaluation data is the above-mentioned offset of the first address of the data transfer information that will be executed next as the chain operation.

The ALU 35 multiplies the read evaluation data by one, two, or four or shifts the read evaluation data by zero, one, two bits according to the transfer data size (the data size of the table) that is specified by the Sz[1:0] bit and generates an offset value of the table. The amount of shift can be specified by the SF[2:0] bit as necessary. Then, the offset value of the table is added to the SAR2 and used as the source address.

The transfer data is read from the above-mentioned source address (the SR state). Note that the transfer data that has been read will not be written (the DR state).

After that, without updating the SAR2 and writing the transfer data at the address of the original data transfer information INF11, the VAR corresponding to the MR, the SAR1, and the SAR2 that have been read in the IR state is incremented, and processing by the data transfer information INF11 is completed (the IW state).

Next, the content that has been read from the table is multiplied by 16 or a result obtained by a four bits shift is added to the VAR that corresponds to the address next to the data transfer information INF11. By doing so, the first address of the data transfer information that is started as the chain operation is generated. Note that multiplying the table by 16 corresponds to the fact that the data transfer information is four longwords (i.e., 16 bytes).

Next, data transfer information INF 22 is read based on the generated first address of the data transfer information that is started in the chain operation, and the data transfer is performed.

In the branch mode, a command is input via communication means such as a serial communication interface (SCI), and the DTC 3 is started by a reception completion interruption. A table reference is performed using this command as the evaluation data, and the data transfer information corresponding to a result of the table reference can be obtained. Then, the data transfer (the chain operation) is continued based on the generated data transfer information. Thus, a parameter corresponding to the command (the offset stored in the table) can specify the data transfer information. As a result, it is possible to flexibly select the source address and the destination address according to the parameter.

Figure 6:
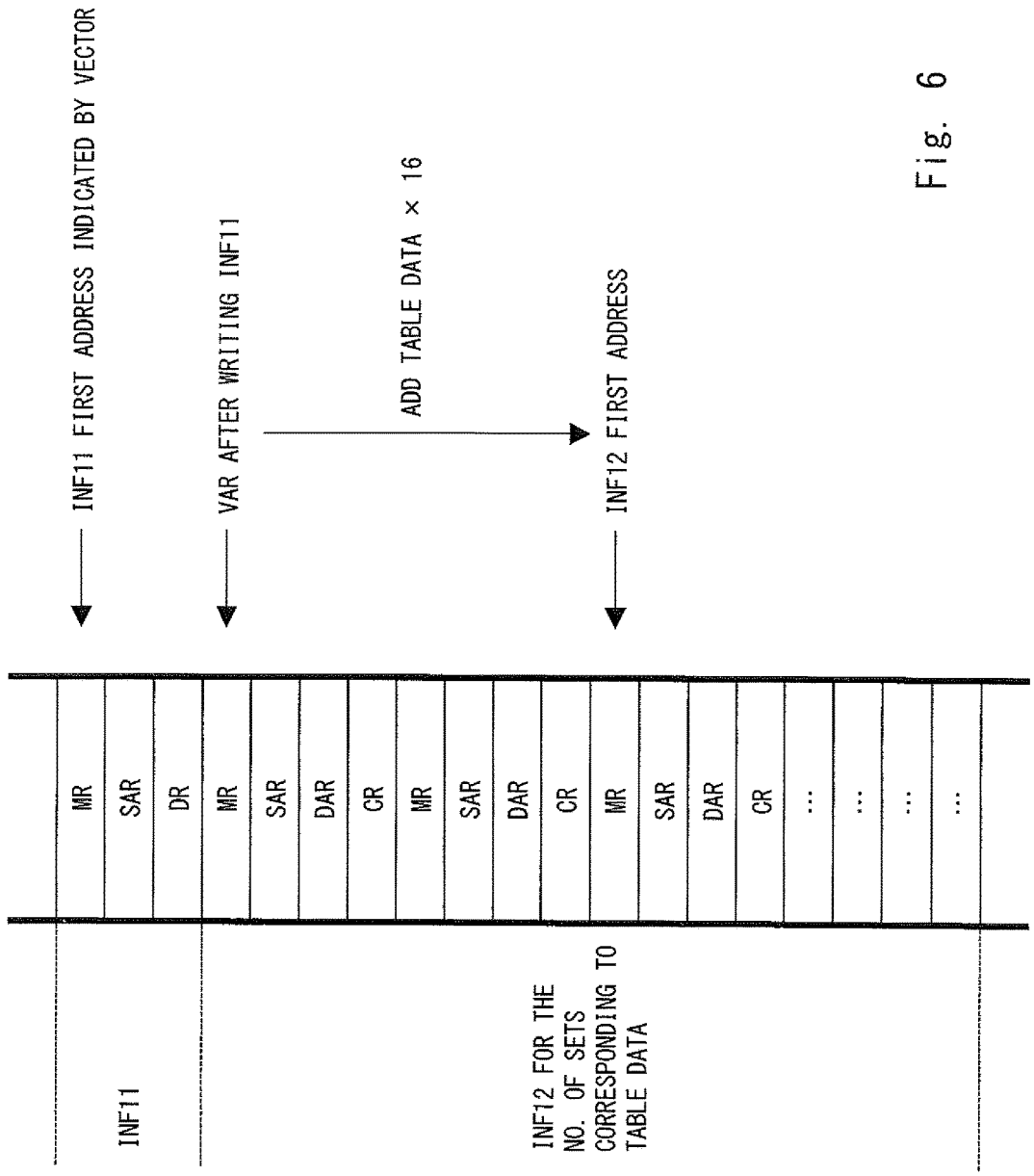
FIG. 6 is a diagram showing an example in which data transfer information is specified in the branch mode.

FIG. 6 shows an example in which the data transfer information is specified in the branch mode. In the branch mode, in order to switch the data transfer information used for the data transfer in the chain operation according to the evaluation data, necessary sets of data transfer information are prepared in advance.

The data transfer information INF11 is specified by a vector. After one data transfer by the data transfer information INF11 is completed, the data transfer information INF11 is written at the address stored in the VAR, the address is incremented, and the address next to the address where the data transfer information INF11 is stored is held in the VAR.

In the branch mode, as the data transfer information INF11 is not updated, actual writing is not performed, and only the address (VAR) is incremented inside the DTC 3.

The VAR and the value obtained by multiplying the evaluation data by 16 are added by the ALU 35 so as to obtain the first address of the data transfer information INF22.

Note that the evaluation data may not be multiplied by 16, and the VAR may be added to the evaluation data. Thus, it is possible to handle the case in which the data transfer information is a variable length by setting the evaluation data.

The same data or data transfer information INF12 may be used for a plurality of commands or parameters. For example, the no-operation mode is specified in the data transfer information INF12 for a plurality of commands that should be entrusted to the CPU, the DTE bit is cleared to "0", and an interruption is requested to the CPU.

Further, for example, when the parameter corresponding to a status request command is set to "0", a data transfer and the like to a predetermined transmission data register of a predetermined status register is set in the data transfer information INF12 that is in a region consecutive to the data transfer information INF11. The processing of the CPU is not necessary, and a response to the command can be realized only by the DTC.

As described above, according to this configuration, as the output data corresponding to the input data is obtained by referring to the table, it is possible to realize control corresponding to control. Further, by using a table, the dedicated hardware required for control corresponding to the control can be minimized. Furthermore, by specifying an effective bit of the input data (a logical AND with the DR and a shift), the amount of information in the table can be reduced.

Moreover, according to this configuration, the normal data transfer function (a normal data transfer) in response to an event and a data transfer function (a table reference) for performing the table reference can be realized by one piece of hardware. These functions can be switched by the data transfer information. That is, it is only necessary to provide the dedicated hardware for the number of pieces that are necessary for one data transfer. Accordingly, by adding functions, the amount of data transfer information which will be used increases, and thus even when the size of the hardware increases, it is possible to suppress an increase in a physical size of the entire semiconductor apparatus (a microcomputer). In other words, as the normal data transfer function and the data transfer function for performing the table reference can be realized by one piece of hardware, it is possible to suppress the increase in the physical size of the semiconductor apparatus (the microcomputer). Further, the interrupt controller, the DTC vector and the like are shared, thereby simplifying the hardware configuration.

In this configuration, the CR can be specified as being disabled. It is thus possible to perform control for the arbitrary number of times according to a state of the semiconductor apparatus (the microcomputer) in addition to performing the data transfers for a predetermined number of times. Consequently, the amount of the data transfer information can be reduced, thereby speeding up the DTC operation and improving usage efficiency of the memory. Further, by disabling the CR, the data transfer information will not be updated, that is, it will not be necessary to write back the data transfer information.

According to this configuration, the DTC can perform the data transfer and the table reference on behalf of the CPU. Therefore, the number of times for requesting an interruption to the CPU can be reduced, and the period in which the CPU is in a low power consumption state can be longer. In addition, the exception processing, evacuation and recover processing of a stack, and a return instruction which should be executed by the CPU in the interrupt processing will be unnecessary, thereby contributing to simplification of the program and improvement in the efficiency of the system. It is possible to reduce the time from occurrence of an event till execution of a necessary operation, and thus so-called responsiveness can be improved. Further, the DTC has a logical size smaller than that of the CPU and can perform processing at a speed higher than the CPU can. When the CPU enters the low power consumption state while the DTC is operating, the power consumption of the semiconductor apparatus (the microcomputer) can be made low.

Moreover, the data transfer controller that has been explained in this embodiment is not limited to a particular usage and is capable of storing the data transfer information in a general-purpose storage device such as a RAM. Such a data transfer controller has following advantages.

(1) The number of data transfers can be increased. In a method in which the data transfer information is held in hardware dedicated to the data transfer controller such as a so-called DMA (Direct Memory Access) controller, the number of data transfers is limited depending on the hardware on which the data transfer controller is mounted. Meanwhile, in the data transfer controller, as the data transfer information is stored in a RAM, a usage of which is not limited, it is easy to increase the number of data transfers, thereby responding to various usages of users.

(2) In a method in which a selection of a startup cause is made by the control register of the data transfer controller itself and implemented in an interface of the microcomputer, is difficult to handle a number of interruptions or events. Meanwhile, in the data transfer controller, it is possible to select whether to request an interruption to the CPU or to request a data transfer to the DTC, using the interrupt cause. In this manner, a data transfer can be performed for many interruptions or event occurrences.

(3) The number of data transfers executed in one startup such as the chain operation can be increased, and the function can be realized by combining different types of data transfers.

(4). The configuration of the data transfer information can be changed. Further, the amount of data constituting the data transfer information can be increased or reduced.

(5) The number of pieces of dedicated hardware may be the number that is necessary for a minimum (one) data transfer. Therefore, even when the function of the MCU is added, and the size of the hardware is increased, an increase in the physical size of the entire MCU can be suppressed.

(6) As hardware dedicated to the data transfer controller does not have a control register or the like, it is not necessary to consider a complicated operating condition such as a conflict with writing from the CPU. It is therefore possible to contribute to reduce the increase in the physical size of the MCU.

Second Embodiment

Figure 7:
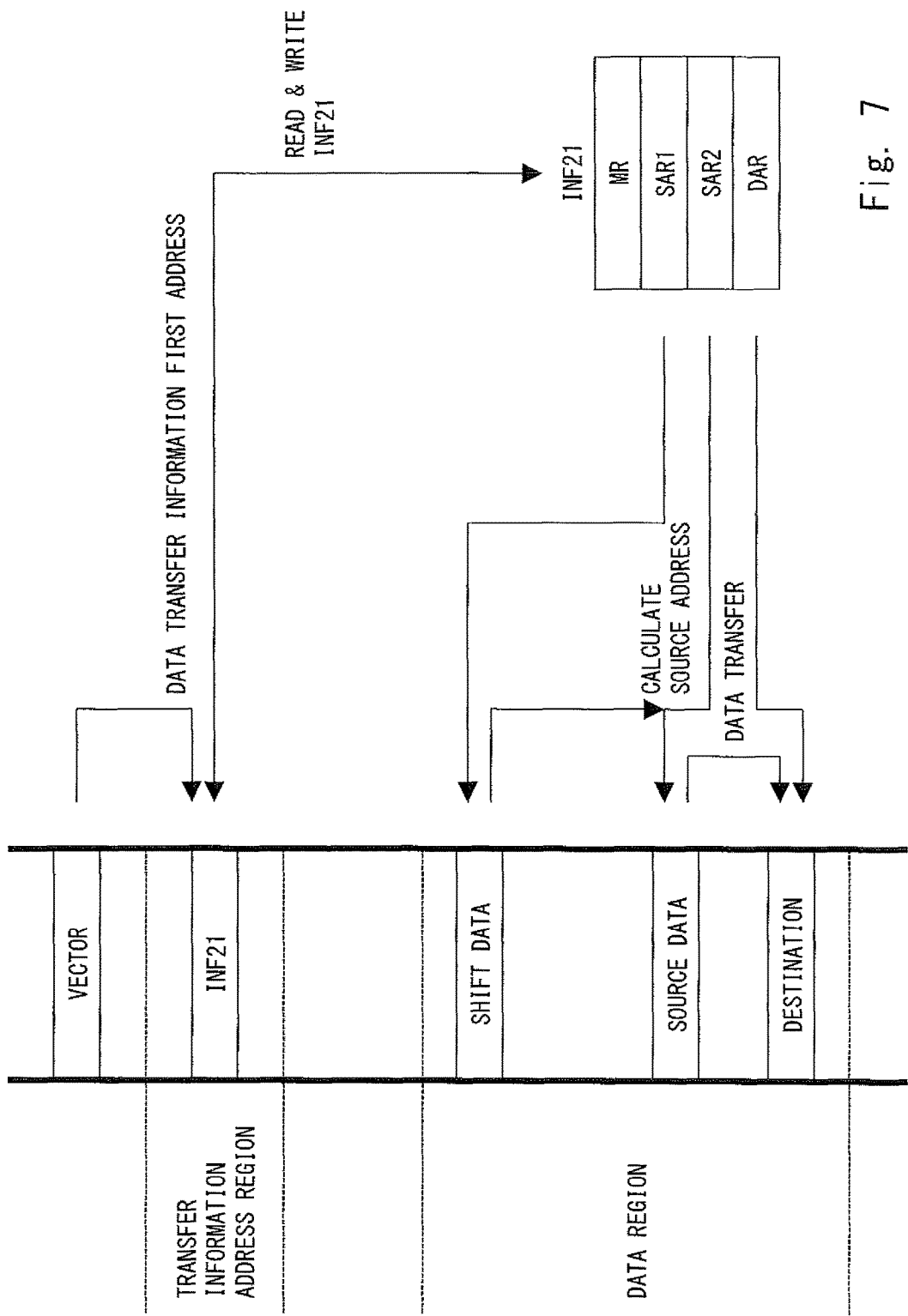
FIG. 7 is a diagram showing a data transfer in a shift mode.

A microcomputer according to a second embodiment shall be explained. In this embodiment, an operation of the MCU 100 when the table reference mode is the shift mode shall be explained. FIG. 7 shows a data transfer in the shift mode. When the TLU bit is "1" and the SFT bit is "1", the table reference mode will be the shift mode.

The CPU 1 writes necessary data transfer information in a predetermined transfer information address region. Data to be written in the data transfer information (also referred to as output data), for example, a speed parameter, is prepared as the table data. In this state, when an interrupt cause occurs, and the DTC 3 is started, a data transfer information first address is read from a corresponding vector region (the VR state).

Data transfer information INF21 is read from the data transfer information disposed region based on the read address (the IR state). In the shift mode, the data transfer information INF21 is the MR, the SAR1, the SAR2, and the DAR.

Data of the data size that is specified by the ISz[1:0] bit is read from the address that is specified by the SAR1 (the DR state). The read data shall be referred to as shift data.

The ALU 35 performs an operation to multiply the read shift data by one, two, or four or shifts the read shift data by zero, one, two bits according to the transfer data size (the data size of the table) that is specified by a Sz[1:0] bit. The amount of shift can be specified by the SF[2:0] bit as necessary. Then, a result of the operation is added to the SAR2 and used as the source address. The DTC 3 sets a result of the addition as the content of the SAR2.

The transfer data is read from the source address that is specified by the SAR2 (the SR state), and the transfer data is written at the destination address that is specified by the DAR (the DW state). The destination address is, for example, a timer.

After that, the register that has been updated among the data transfer information, which is specifically the SAR2, is written at the original address (the IW state).

Figure 8:
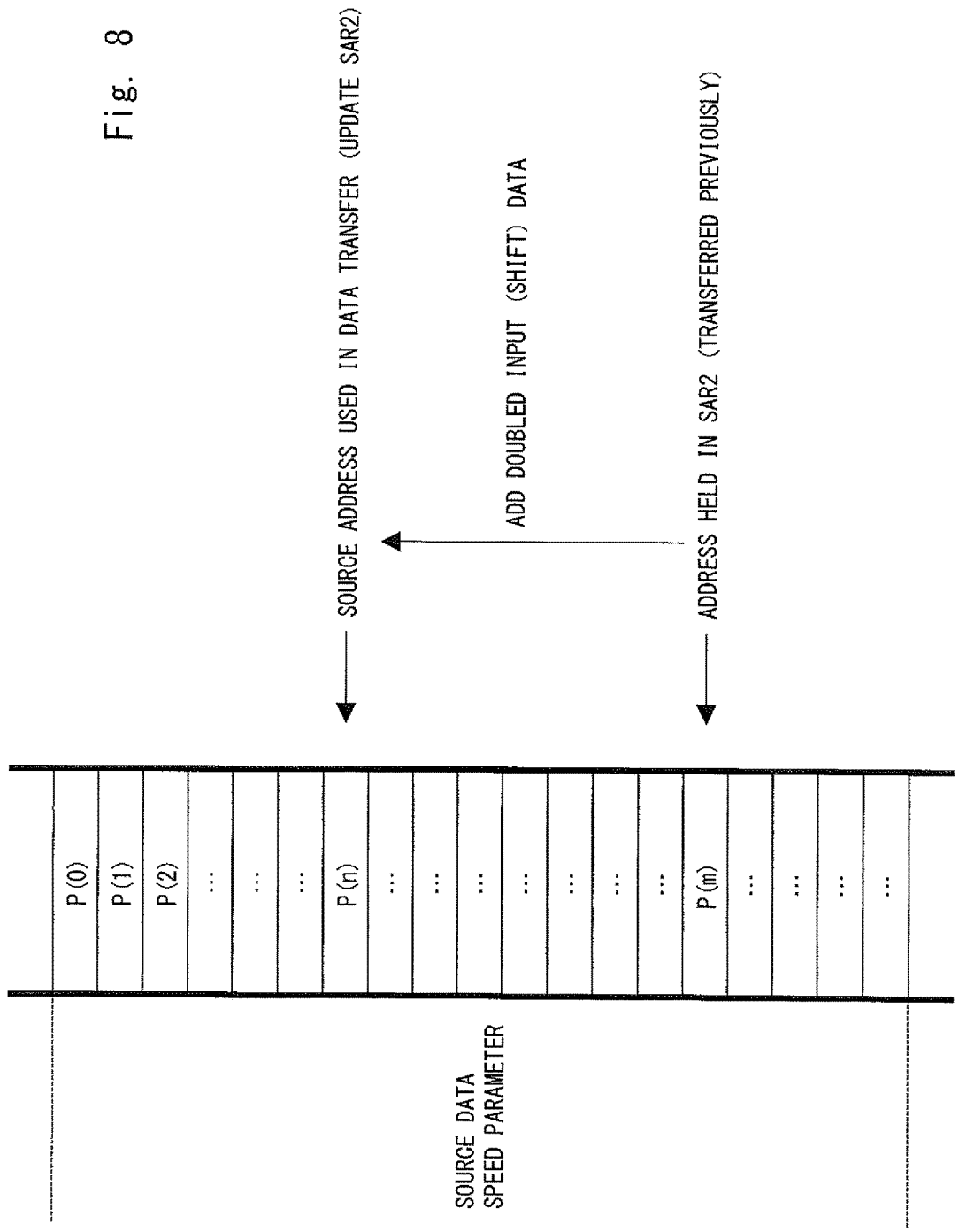
FIG. 8 is a diagram showing an example of a specifying method of a table that is used in the shift mode.

FIG. 8 shows an example of a specifying method of a table used in the shift mode. For example, a case in which speed data is provided to a timer for driving a motor when controlling data for specifying a speed of the motor shall be considered. This speed parameter is calculated in advance and stored in a table of the ROM. An address of the speed parameter shall be specified by the SAR2. This speed parameter is, for example, 16 bits, and the speed increases in an ascending order.

The word size is specified by the Sz[1:0] bit, and the input data (the shift data) is doubled and added to the SAR2. At the stage of initial setting, the SAR2 specifies a parameter 0.

When it is necessary to drive the motor, a predetermined speed parameter, for example a parameter m, is transferred to the timer based on the shift data. The state of the motor is monitored by another timer or an analog input, and when it is evaluated that the speed is sufficient, the shift data in the negative direction, that is, the speed parameter that is slower (a parameter n), is obtained and transferred to the timer.

In this example, for example, the state of the motor controlled by the microcomputer is input by the A/D converter (corresponding to the analog module 9). This input is used as a conversion completion interruption so as to start the DTC 3. Then, a result of the conversion by the A/D converter is used as the shift data, and the speed data (the output data) can be provided to the timer for driving the motor. As the speed data corresponding to the state of the motor is calculated in advance and stored in the table of the ROM, it is not necessary to perform an operation in an actual operating state and the table may be referred.

As explained above, by using the shift mode, it is possible to transfer data which feeds back a state of an object to be controlled by the microcomputer.

Third Embodiment

Figure 9:
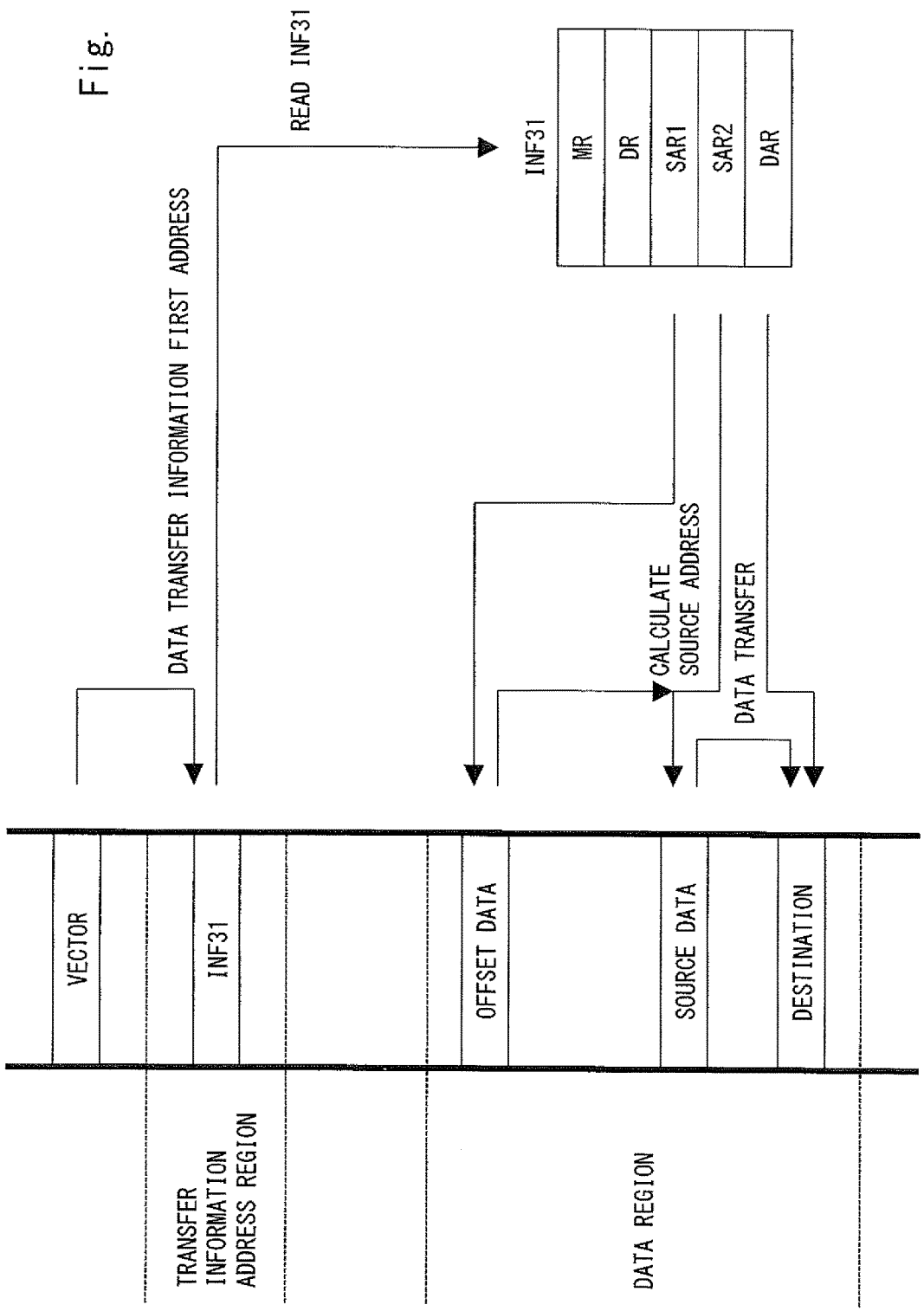
FIG. 9 is a diagram showing a data transfer in an offset mode.

A microcomputer according to a third embodiment shall be explained. In this embodiment, an operation of the MCU 100 when the table reference mode is the offset mode shall be explained. FIG. 9 shows a data transfer in the offset mode. When the TLU bit is "1" and the OFM bit is "1", the table reference mode will be the offset mode.

Firstly, in a manner similar to the shift mode, the DTC 3 transitions to the VR state and the IR state. Data transfer information INF31 in the offset mode is the MR, the DR, the SAR1, the SAR2, and the DAR.

Data is read from the address that is specified by the SAR1 (the DR state). The read data shall be referred to as offset data.

Mask data which specifies an effective bit in the read offset data is held in the DR. For example, when the offset data is 32 bits, and most significant eight bits and least significant four bits are ignored, "00FFFF0" is set as the mask data. Note that as the most significant eight bits are ignored, sign extension may be performed. Further, as the least significant four bits are ignored, the data is temporarily right-shifted by four bits. Then, a left-shift by zero, one, and two bits is performed according to the size specified by the Sz[1:0] bit. A result of the left-shifted data is added to the SAR2, and a result of the addition is used as the source address. The DTC 3 sets the result of the addition as the content of the SAR2.

The transfer data is read from the source address that is specified by the SAR2 (the SR state), and the transfer data is written at the destination address that is specified by the DAR (the DW state).

After that, without updating the SAR2, that is, without writing the SAR, which has been updated inside the data transfer information, at the original address, the processing is completed (the IW state).

Figure 10:
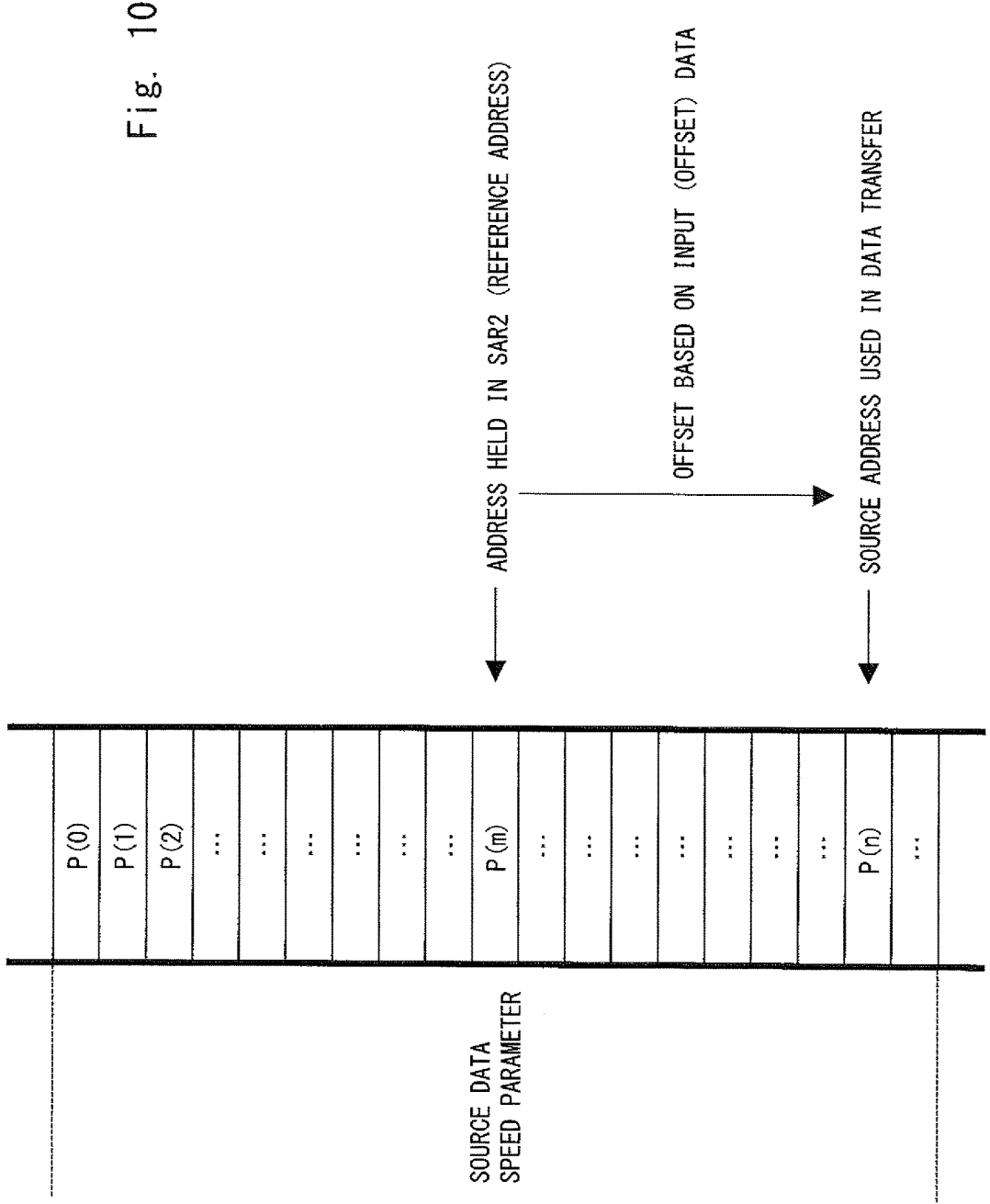
FIG. 10 is a diagram showing an example of a specifying method of a table that is used in the offset mode.

FIG. 10 shows an example of a specifying method of a table used in the offset mode. The structure of the table can be the same as that of the table in the shift mode.

The SAR2 holds a reference address of the table. In FIG. 10, although a center of the address region is the reference address (the parameter m), a different address such as a first address may be the reference address. An offset based on the input data (the offset data) is added to the reference address, and the output data (the parameter n) is obtained.

Then, by specifying an effective bit of the input data (a logical AND with the DR), the necessary size of the table can be reduced.

Fourth Embodiment

A microcomputer according to a fourth embodiment shall be explained below. In this embodiment, an operation of the MCU 100 in the case of performing PID control that applies the table reference mode shall be explained. In this embodiment, the proportional mode (P), the integral mode (I), and the differential mode (D) shall be used as the table reference mode. Then, a result of a data transfer in the proportional mode, the integral mode, and the differential mode is added by a data transfer in a block addition mode, which is one of the transfer modes, so as to realize the PID control. Hereinafter, the data transfer in the respective table reference modes and the block addition mode shall be explained.

Proportional Mode

Figure 11:
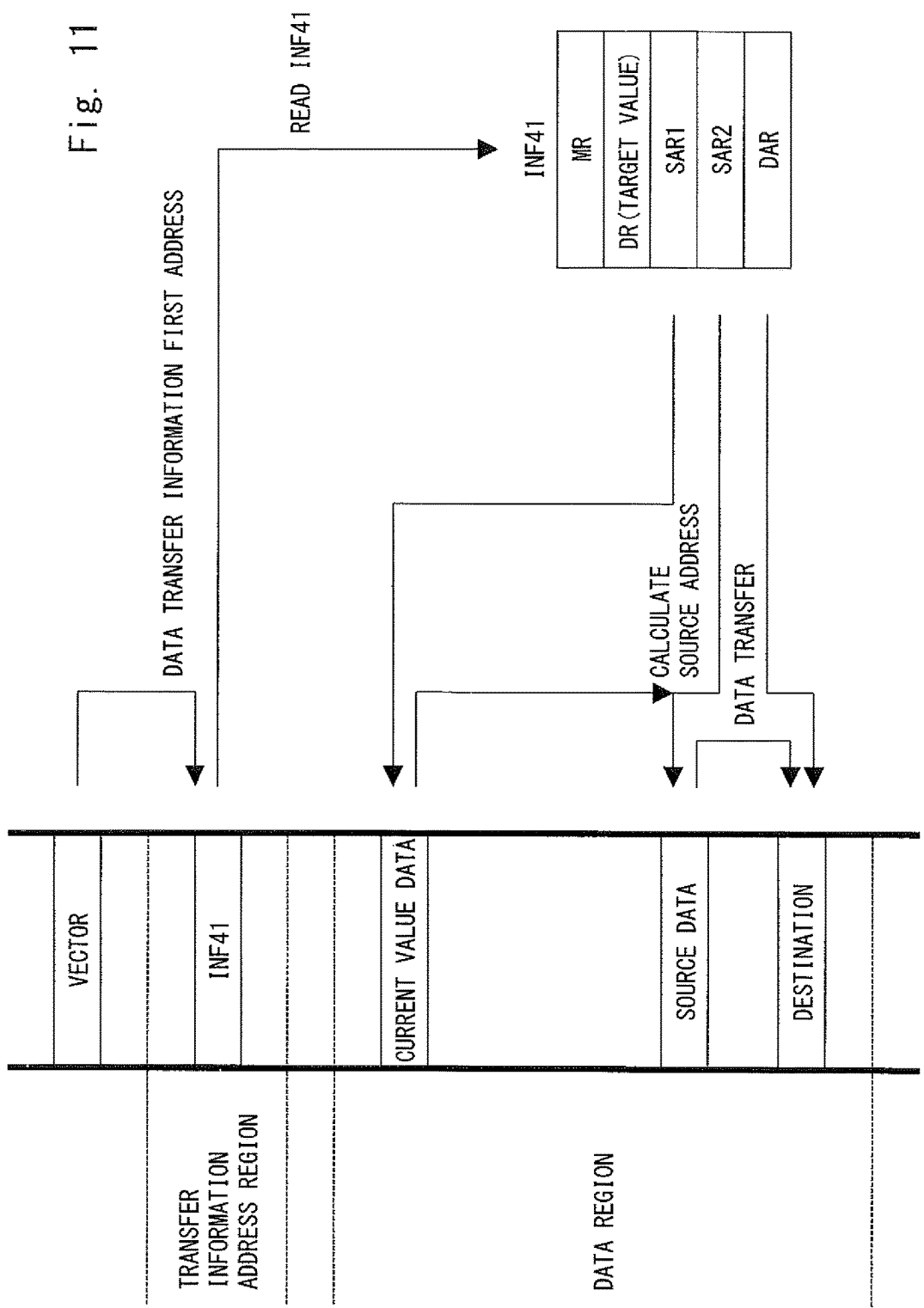
FIG. 11 is a diagram showing a data transfer in a proportional mode.

The proportional mode shall be explained. FIG. 11 shows a data transfer in the proportional mode. When the TLU bit is "1" and the PRM bit is "1", the table reference mode will be the proportional mode.

Firstly, in a manner similar to the shift mode, the DTC 3 transitions to the VR state and the IR state. Data transfer information INF41 in the proportional mode is the MR, the DR, the SAR1, the SAR2, and the DAR.

Data is read from the address that is specified by the SAR1 (the DR state). The read data shall be referred to as current value data.

Target value data is held in the DR. Then, a deviation between the current value data and the target value data is calculated. Next, a left-shift by zero, one, and two bits is performed according to the size specified by the Sz[1:0] bit. A result of the left-shift is added, and a result of the addition is used as the source address. The DTC 3 sets the result of the addition as the content of the SAR2.

After that, in a manner similar to the offset mode, the DTC 3 transitions to the SR state and the DW state.

After that, without updating the SAR2, that is, without writing the SAR, which has been updated inside the data transfer information, at the original address, the processing is completed (the IW state).

The current value data can be obtained from, for example, the result of the conversion by the A/D converter (corresponding to the analog module 9) or a phase count of the timer. The DTC 3 can be started by a conversion completion interruption of the A/D converter or an interval timer (corresponding to the timer 7) interruption.

In the proportional mode, output data corresponding to a deviation between the current value, which is the input data and a value to be controlled, and the target value, can be obtained by referring to the table. Proportional control in which, for example, when the deviation is large, the output data is increased, while when the deviation is small, the output data is reduced, can be realized.

Differential Mode

Figure 12:
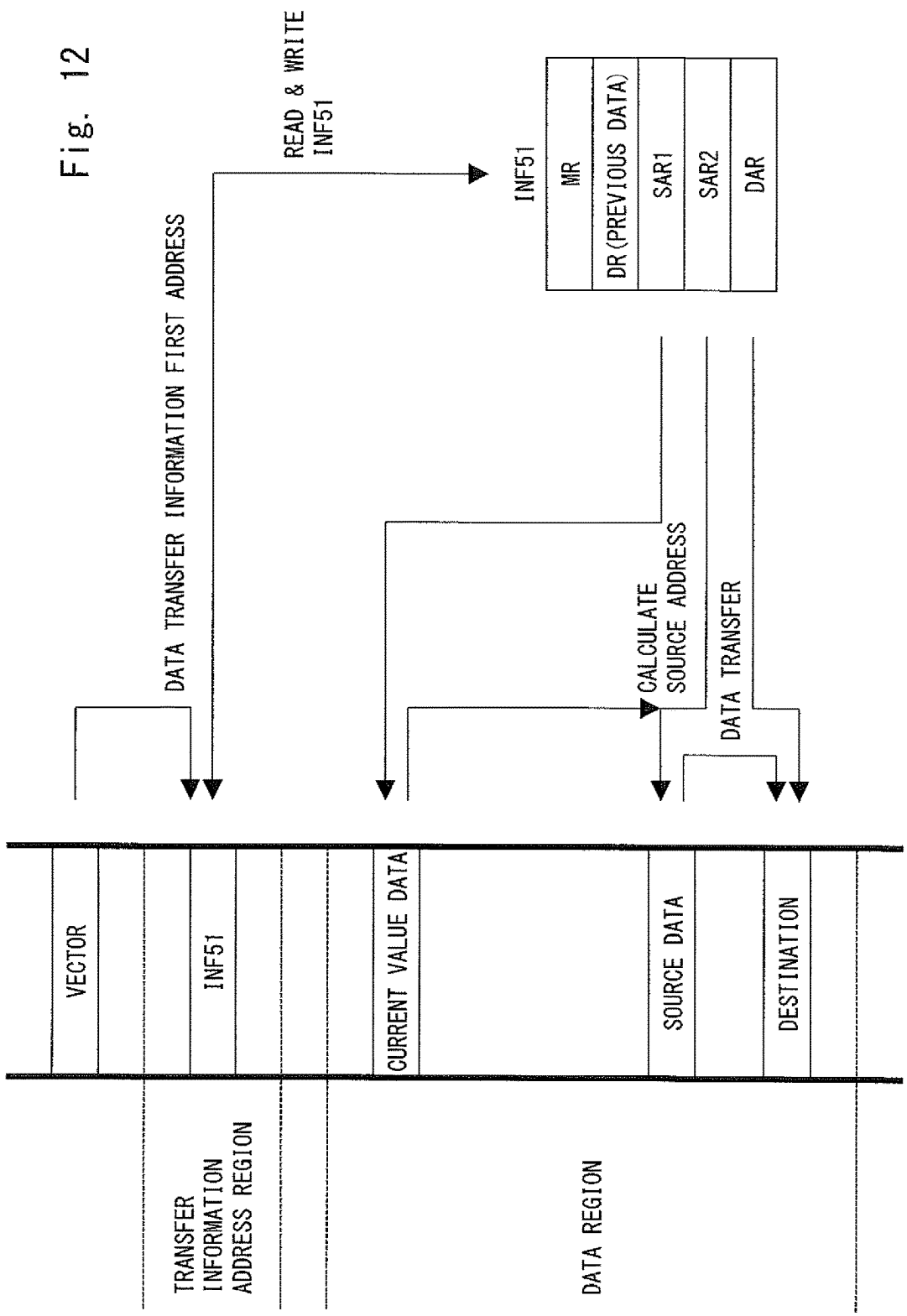
FIG. 12 is a diagram showing a data transfer in a differential mode.

Next, the differential mode shall be explained. FIG. 12 shows a data transfer in the differential mode. When the TLU bit is "1" and the DRM bit is "1", the table reference mode will be the differential mode.

Firstly, in a manner similar to the shift mode, the DTC 3 transitions to the VR state and the IR state. Data transfer information INF51 in the differential mode is the MR, the DR, the SAR1, the SAR2, and the DAR.

The current value data is read from the address that is specified by the SAR1 (the DR state).

Previous (old) current value data is held in the DR, and the new current value data that has been read is compared with the previous current value data. A result of the subtraction corresponds to a differential value (a speed). Next, a left-shift by zero, one, and two bits is performed according to the size specified by the Sz[1:0] bit. A result of the left-shift is added to the SAR2, and a result of the addition is used as the source address. The DTC 3 sets the result of the addition as the content of the SAR2. The content of the DR is replaced by the read new current value data.

After that, in a manner similar to the offset mode, the DTC 3 transitions to the SR state and the DW state.

Next, the register that has been updated among the data transfer information, which is specifically the DR (the current value data that has been read), is written at the original address (the IW state).

In the differential mode, the output data corresponding to two changes in the current value (the differential value), which is the input value and a value to be controlled, can be obtained by referring to the table. Derivative control in which, for example, when the change is large, the output data is reduced, while when the change is small, the output data is increased, can be realized.

Integral Mode

Figure 13:
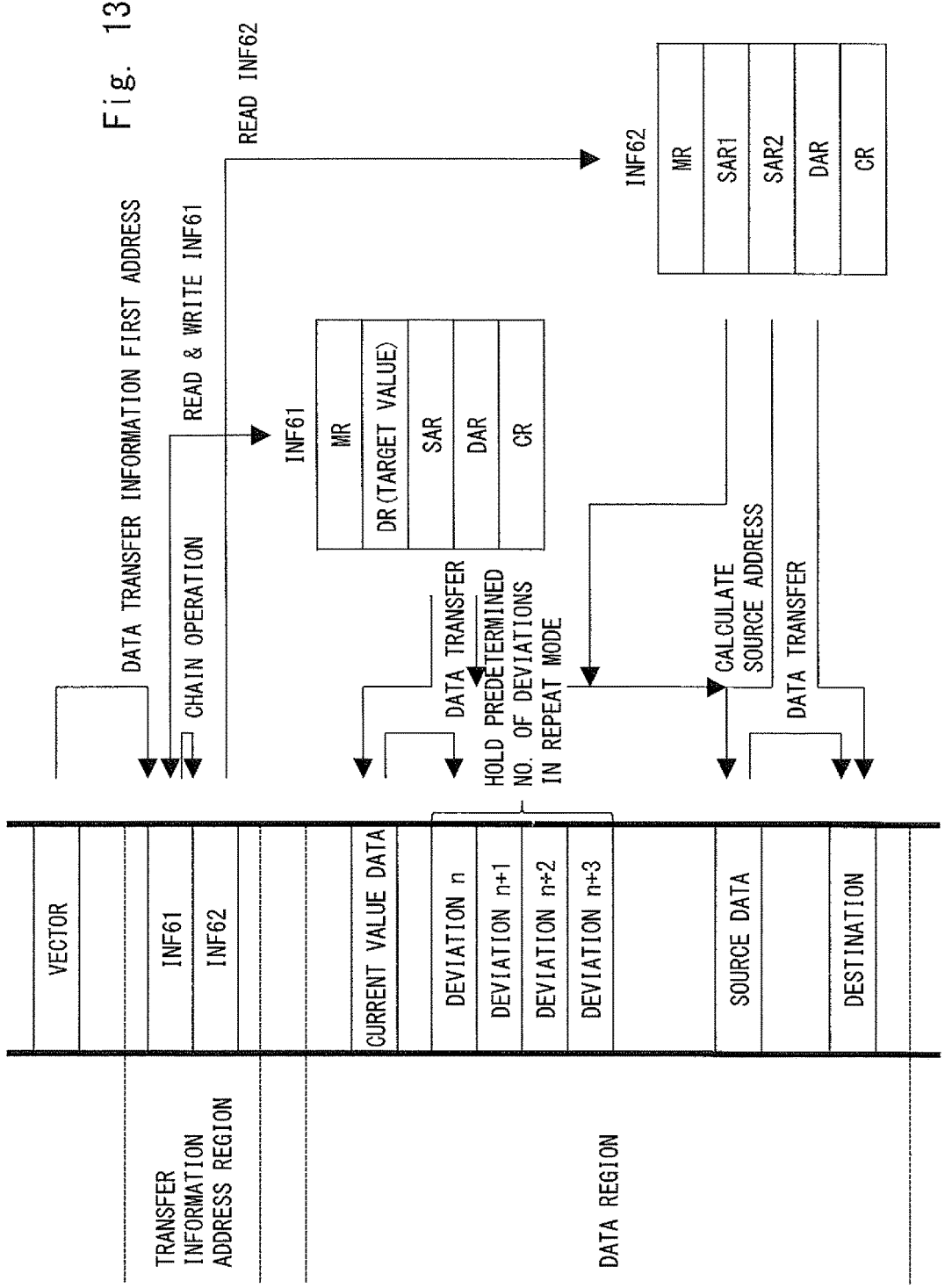
FIG. 13 is a diagram showing a data transfer in an integral mode.

Next, the integral mode shall be explained. FIG. 13 shows a data transfer in the integral mode. The TLU bit is set to "1". In the integral mode, two data transfers that are coupled by the chain operation is performed. The TMD[1:0] bit is set to "01" (the repeat mode), and the NXTE1 bit is set to "1" (the chain operation).

Firstly, a first data transfer is performed. Data transfer information INF61 at this time is the MR, the DR, the SAR1, the DAR, and the CR. At this time, the DRE bit is set to "1".

In a manner similar to the shift mode, the DTC 3 transitions to the VR state and the IR state.

The current value data is read from the address that is specified by the SAR1 (the SR state).

The target value data is held in the DR, and a subtraction is performed between the target value data and the current value data that has been read. Next, a result of the subtraction is written at the address that is specified by the DAR (the DW state). The writing is performed by the same operation as in the repeat mode. In this manner, deviation data between the current value and the target value (a deviation n to a deviation (n+3)) is accumulated for the number specified by the TCRH of the CR (four in FIG. 13).

After that, the register that has been updated among the data transfer information, which is specifically the DAR and CR, is written at the original address (the IW state).

Next, a second data transfer is performed. Data transfer information INF62 at this time is the MR, the SAR1, the SAR2, the DAR, and the CR. At this time, the INM bit is set to "1".

The data transfer information INF62 is read from the data transfer information disposed region (the IR state). The data transfer information INF62 is read from the address that is consecutive to the data transfer information INF61.

In a manner similar to the block transfer mode, the deviation data between the current value and the target value is read for the number specified by the TCRL from the address that is specified by the SAR1 while incrementing or decrementing the SAR1 and decrementing the TCRH (the DR state). Then, when the TCRH decreases to "0", the contents of the SAR1 and TCRH are returned to the initial setting values. At this time, the data size is specified by the ISz[1:0] bit.

The read deviation data is added inside the DTC 3, and a division or a right-shift is performed according to the added number. It may be configured in such a manner that the division or the right-shift may be automatically performed according to the number of added data (the content of the TCRL) or may be specified by the SF[2:0] bit. A result of the division or the right-shift is left-shifted by zero, one, two bits according to the size that is specified by the Sz[1:0] bit. A result of the left-shift is added to the SAR2, and a result of the addition is used as the source address.

The transfer data is read from the source address that is specified by the SAR2 (the SR state), and the transfer data is written at the destination address that is specified by the DAR (the DW state).

After that, without updating the SAR2, that is, without writing the SAR2, which has been updated inside the data transfer information, at the original address, the processing is completed (the IW state).

Note that a region that is written in the first data transfer by the data transfer information INF61 and read in the second data transfer by the data transfer information INF62 should be initialized before starting the operation.

In the integral mode, the output data corresponding to accumulation of the deviations between the current value, which is the input data and a value to be controlled, and the target data for a certain period of time can be obtained by referring to the table. Integral control in which, for example, when the accumulated value is large, the output data is increased, while when the accumulated value is small, the output data is reduced, can be realized.

Further, the subtraction from the target value data, which has been set to the DR, may not be performed in the first data transfer by the data transfer information INF61 (DRE=0) but may be performed in the second data transfer by the data transfer information INF62 (DRE=1).

Block Addition Mode

Figure 14:
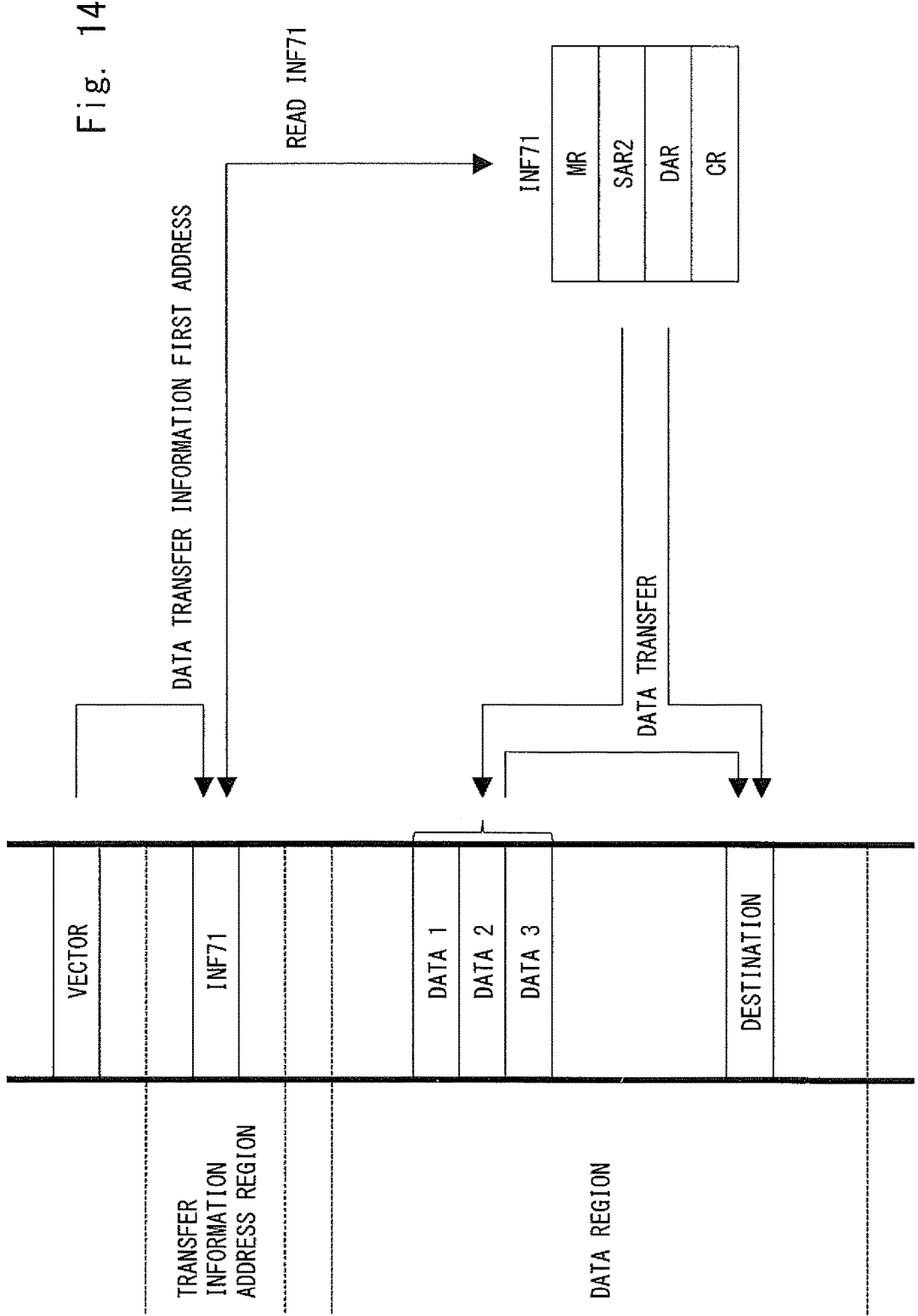
FIG. 14 is a diagram showing a data transfer when a transfer mode is a block addition mode.

Next, the block addition mode, which is one of the data transfer modes, shall be explained. FIG. 14 shows a data transfer when the transfer mode is the block addition mode. In the block addition mode, the TLU bit is cleared to "0" (the normal data transfer function), and the TMD1 and the TMD0 bit are set to "11" (the block addition mode).

When the DTC 3 is started, the data transfer information first address is read (the VR state), and the data transfer information is read from the data transfer information disposed region (the IR state). The data transfer information in the block addition mode is the MR, the SAR2, the DAR, and the CR.

In a manner similar to the block transfer mode, the data is read for the number specified by the TCRL from the address that is specified by the SAR2 while incrementing or decrementing the SAR2 and decrementing the TCRH (the DR state). Then, when the TCRH decreases to "0", the contents of the SAR2 and the TCRH are returned to the initial setting values. At this time, the data size is specified by the Sz[1:0] bit.

The read data is added inside the DTC 3 and written at the destination address that is specified by the DAR (the DW state).

After that, without updating the SAR2, that is, without writing the SAR, which has been updated inside the data transfer information, at the original address, the processing is completed (the IW state).

The destination addresses in the proportional mode, the integral mode, and the differential mode are set to consecutive addresses in the RAM, overlapped in the block addition mode, so that they are written in a necessary time for performing motor control and the like. For example, the DTC is started by the interval timer, and the proportional mode, the integral mode, the differential mode, and the block addition mode can be consecutively executed by the chain operation (the NXTE1 bit in the transfer modes other than the block addition mode, which is the last transfer mode, is set to "1"). The PID control corresponding to the input data can be realized.

Fifth Embodiment

Figure 15:
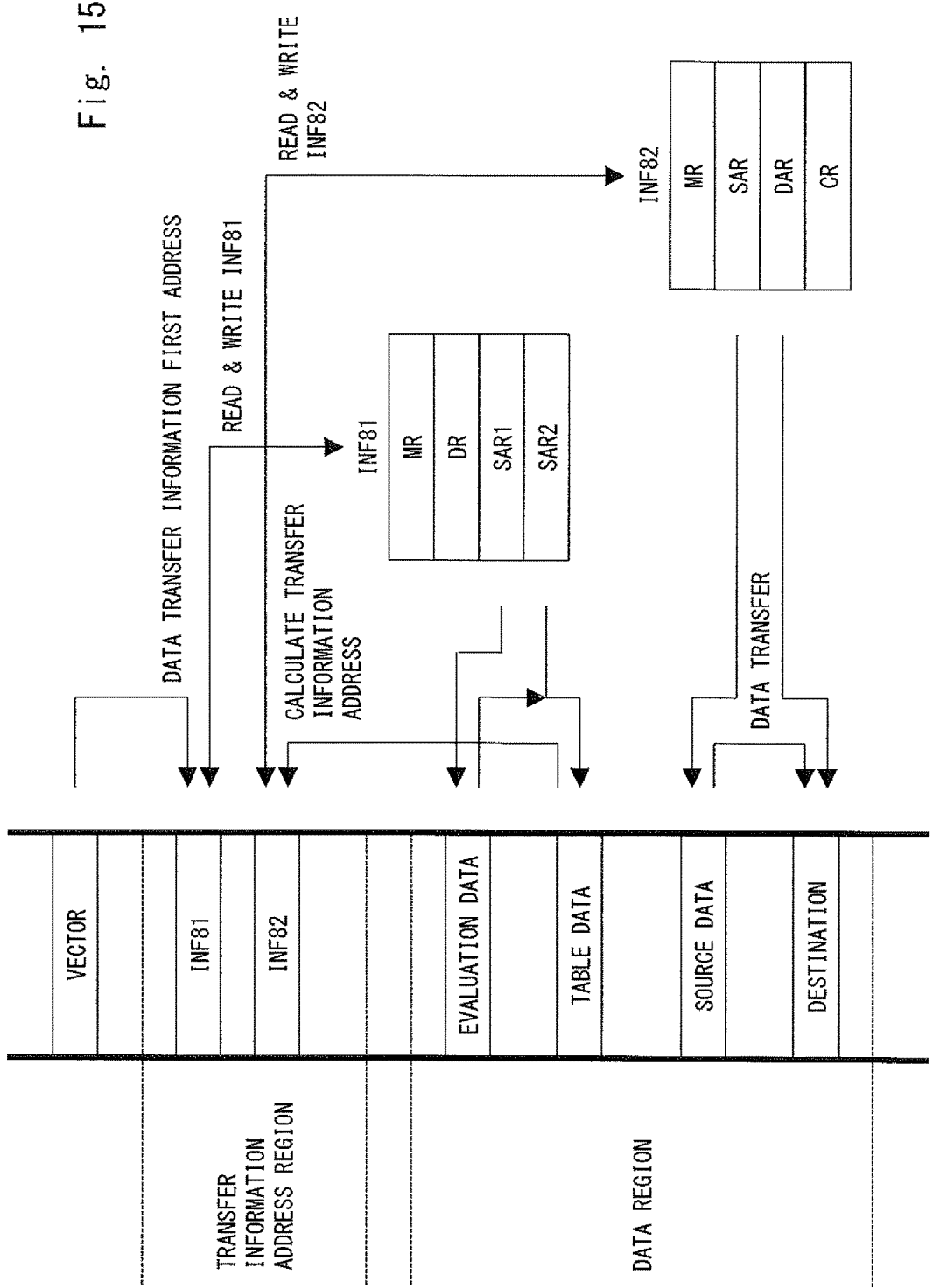
FIG. 15 is a diagram showing a data transfer in a modified example of the branch mode.

A microcomputer according to a fifth embodiment shall be explained. In this embodiment, a modified example of the branch mode according to the first embodiment shall be explained. FIG. 15 shows a data transfer in the modified example of the branch mode. In this modified example, a most significant bit (MSB) prepared in the table selects whether or not there is the chain operation.

Data transfer information INF71 is the MR, the DR, the SAR1, and the SAR2. In the initial setting or in the processing of re-setting after a series of processing is completed such that the CR is "0", the DR is set to "00000000".

The shift data of the data size that is specified by the ISz[1:0] bit is read from the address that is specified by the SAR1 (the DR state). The source address is generated based on the read shift data and the SAR2.

The transfer data is read from the source address that is specified by the SAR2, the read data is stored to the DR, and the bit 31 of the DR is set to "1" as a status indicating that the table has been read (the SR state). Note that the transfer data will not be written (the DW state).

The register that has been updated among the data transfer information, which is specifically the DR, is written at the original address (the IW state).

A case in which the MSB of the table data that has been read is set to "1" shall be explained. In a manner similar to the first embodiment, by the data that is stored in the DR, which is the table data that has been read (the bit 31 is ignored) and the VAR, the first address of the data transfer information that is started in the chain operation is generated. Data transfer information INF72 corresponding to the generated first address is read, and a data transfer is performed based on the data transfer information INF72.

Next, a case in which the MSB of the table data that has been read is cleared to "0" shall be explained. In this case, the processing is completed without performing the chain operation.

Next, the DTC 3 is started by the same startup cause, and when the data transfer information INF71 is read, the TLU bit and the SFM bits are set to "1", and the bit 31 of the DR is set to "1", the data transfer is not performed, and the chain operation is started based on the data stored in the DR and the VAR, in a manner similar to the above-described case. In a manner similar to the above-described case, the data transfer information INF72 is read, and a data transfer is performed based on the data transfer information INF72.

For example, a command is input via communication means such as a serial communication interface (SCI), and the DTC is started by a reception completion interruption. When a table reference is performed using the command as the evaluation data, in some cases, a data transfer corresponding to the command can be immediately executed, while in other cases, it is necessary to wait for a next reception completion interruption.

If it is possible to immediately execute a data transfer corresponding to the command, the MSB of the table data is set to "1", and the data transfer corresponding to the command can be executed by the chain operation.

When it is necessary to wait for a next reception completion interruption, the MSB of the table data is cleared to "0", the table data is stored in the DR in a first startup of the DTC, and the chain operation, which is a transfer, is not performed and the processing is temporarily ended. In a second startup of the DTC 3, as the data transfer information INF31 is read, and the TLU bit, the SFM bit, and the bit 31 of the DR are set to "1", no table reference is performed, the next data transfer information INF32 corresponding to the command is read, and a data transfer is performed based on the data transfer information INF32.

In the second startup of the DTC, the same operation can be performed regardless of the MSB of the table data.

Although it has been explained that the read table data is stored in the DR, the next data transfer information first address of the chain operation may be stored in the DR. Further, in this embodiment, the DR is used as the status indicating that the table has been read, an appropriate bit of the MR may be used.

Figure 16:
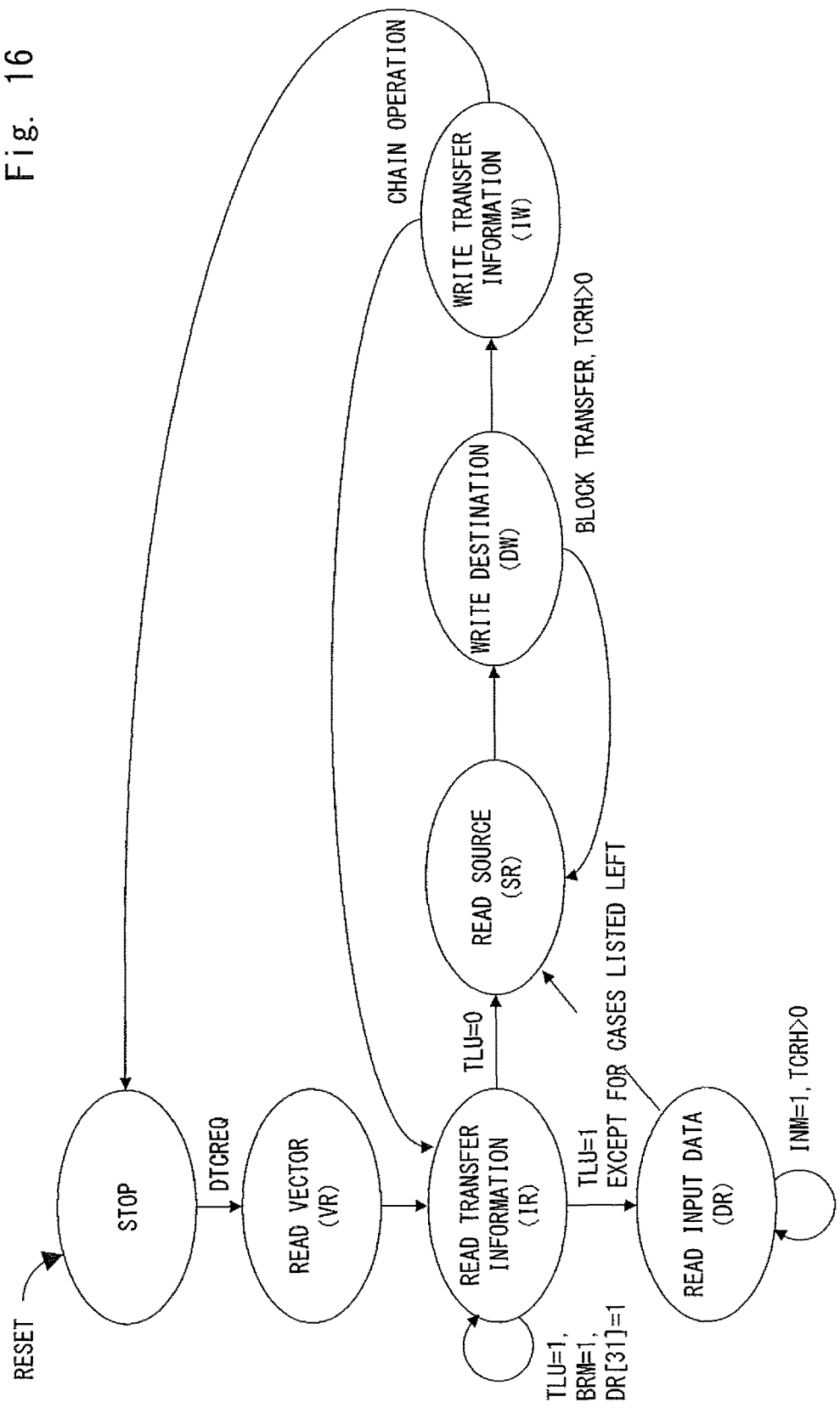
FIG. 16 is a state transition diagram of a DTC in a modified example of the branch mode.

FIG. 16 is a state transition diagram of the DTC in the modified example of the branch mode.

In the IR state, when all of the TLU bit, the SFM bit, and the bit 31 of the DR are set to "1", the DTC transitions to the IR state again and reads the next data transfer information.

According to this configuration, when the table reference mode is the branch mode, it is possible to evaluate whether or not to execute the chain operation based on the information included in the read data.

Sixth Embodiment

Figure 17:
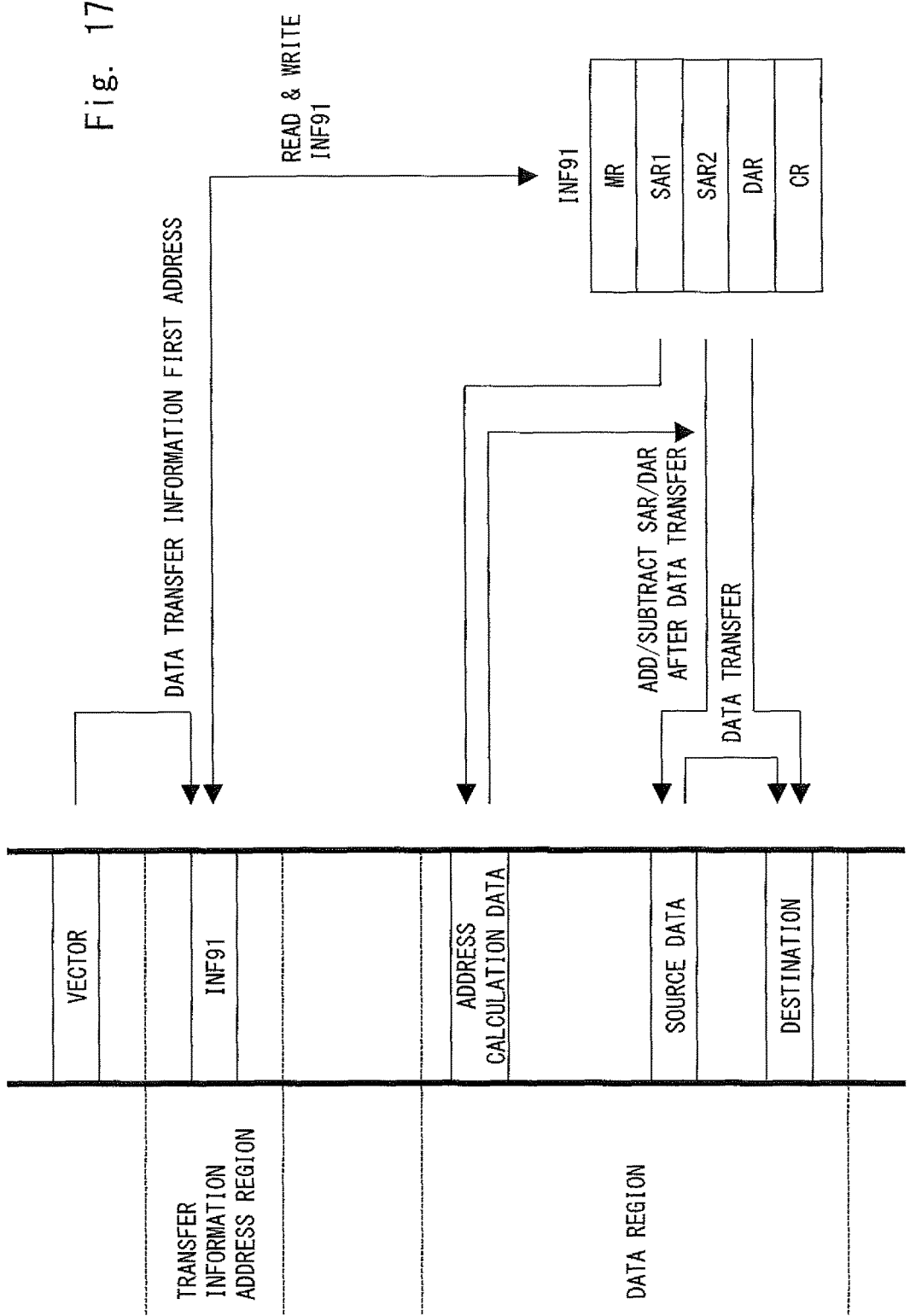
FIG. 17 is a diagram showing a data transfer in an address calculation mode.

A microcomputer according to a sixth embodiment shall be explained. In this embodiment, an operation of the MCU 100 when the table reference mode is the address calculation mode shall be explained. FIG. 17 shows a data transfer in the address calculation mode. When the TLU bit is "1" and the AEM bit is "1", the table reference mode will be the address calculation mode.

When the DTC 3 is started, the data transfer information first address is read from the corresponding vector region (the VR state).

Data transfer information INF81 is read from the data transfer information disposed region based on the read address (the IR state). The data transfer information INF81 at this time is the MR, the SAR1, the SAR2, the DAR, and the CR.

The data of the data size that is specified by the ISz[1:0] bit is read from the address specified by the SAR1 (the DR state). The read data shall be referred to as address calculation data.

The ALU 35 multiplies the read address calculation data by one, two, or four or shifts the read address calculation data by zero, one, two bits according to the transfer data size that is specified by the Sz[1:0] bit. A result of the operation is temporarily held inside the DTC 3 (e.g., the DR).

The transfer data is read from the source address that is specified by the SAR2 (the SR state), and the transfer data is written at the destination address that is specified by the DAR (the DW state). Then, the CR is decremented.

When the DIR bit is "0", instead of an increment or a decrement that is specified by the SM[1:0] bit, the shifted address calculation data is added to or subtracted from the SAR2, and a result of the calculation is stored in the SAR2.

When the DIR bit is "1", instead of an increment or a decrement that is specified by the DM[1:0] bit, the shifted address calculation data is added to or subtracted from the DAR, and a result of the calculation is stored in the DAR.

The register that has been updated among the data transfer information INF81, which is specifically the SAR2 or the DAR and the CR, is written at the original address (the IW state).

The above-mentioned data transfer is repeated for the number of times specified by the CR (TCRH).

Figure 18:
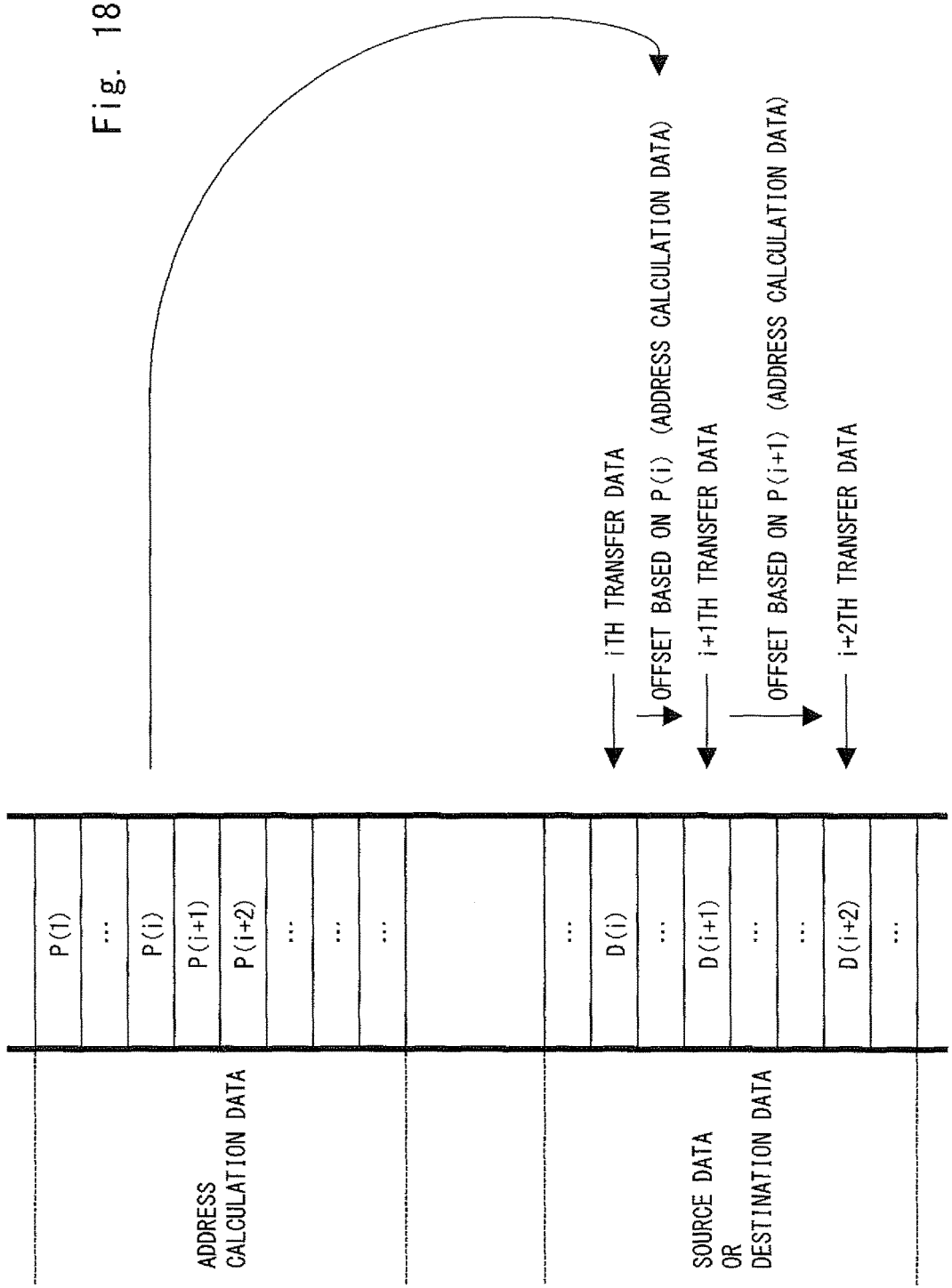
FIG. 18 is a diagram showing an example of a specifying method of a table that is used in the address calculation mode.

FIG. 18 shows an example of a specifying method of a table used in the address calculation mode. When a data transfer of data Di is performed in an ith data transfer, a parameter Pi is read from the address calculation data (the table). After the data transfer of the data Di is performed based on the parameter Pi, an operation is performed on the source address (the SAR2) or the destination address (the DAR).

When a data transfer of data Di+1 is performed in a next i+1th data transfer, addresses of the data Di and the data Di+1 are not consecutive, but an interval is inserted between those addresses based on the parameter Pi.

This interval can be specified by a parameter included in the address calculation data (the table) for every data transfer. Therefore, the DTC 3 can consecutively transfer data that is disposed at an irregular interval by referring to the table.

Seventh Embodiment

Figure 19:
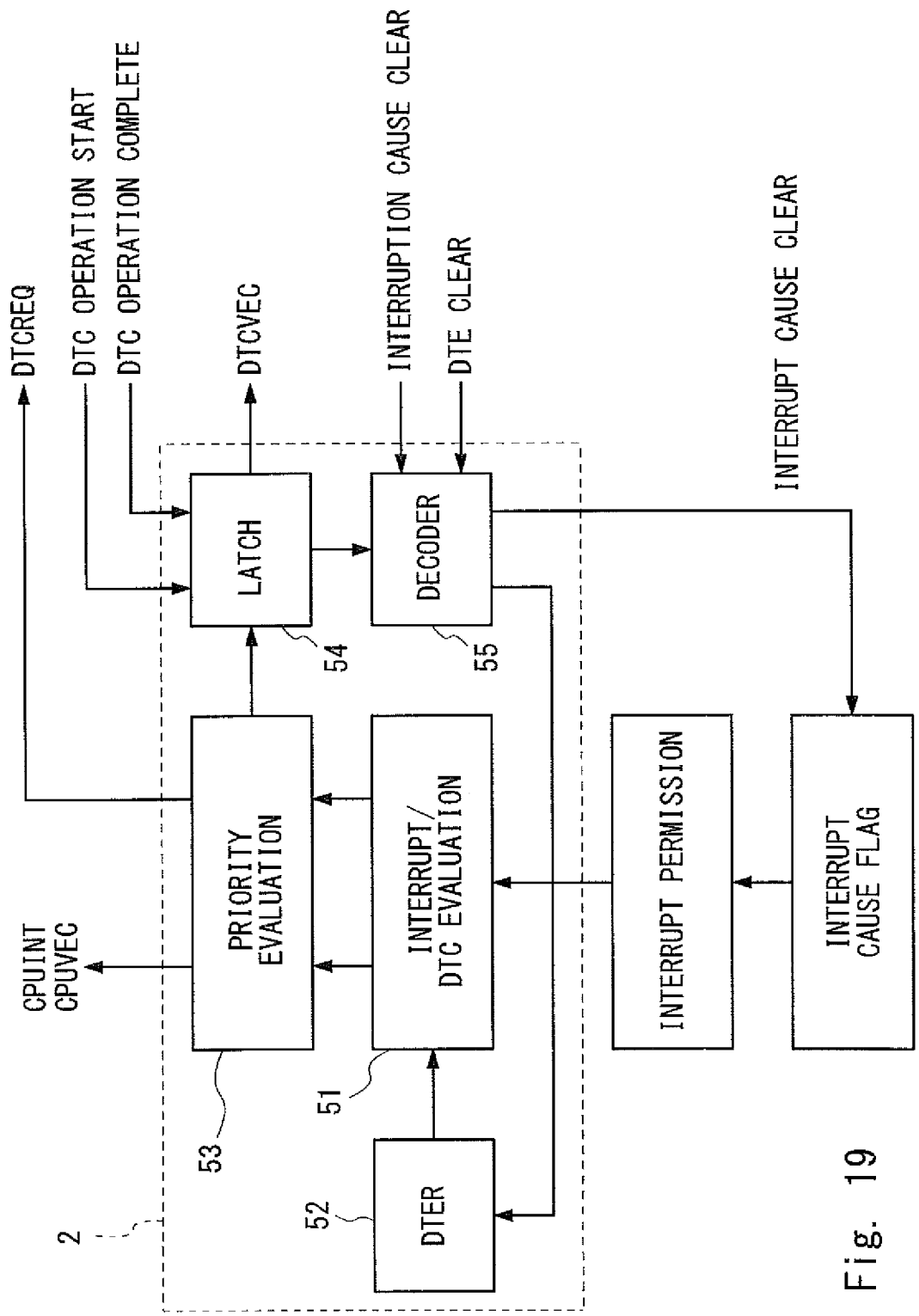
FIG. 19 is a block diagram of an interrupt controller (INT)

A microcomputer according to a seventh embodiment shall be explained. In this embodiment, a specific example of the INT 2 of the MCU 100 shall be explained. FIG. 19 is a block diagram of the interrupt controller (INT) 2.

The INT 2 includes an interrupt/DTC evaluation circuit 51, a DTC permission register (also referred to as a DTER) 52, a priority evaluation circuit 53, a latch circuit 54, and a decoder circuit 55.

There are two types of interrupt causes of the MCU 100, which are an internal interruption and an external interruption, each of them having an interrupt cause flag. When the timer, communication, or analog functional block enters a predetermined state, the interrupt cause flag is set to "1". For example, when an external interrupt input terminal becomes a predetermined level or a predetermined signal change occurs, the external interrupt cause flag is set to "1". The interrupt cause flag is cleared to "0" by a write operation of the CPU 1 and also when the data transfer by the DTC 3 is completed.

An output of each bit of the interrupt cause flag is input to the interrupt permission circuit. A content of the interrupt permission register, that is, an interrupt permission bit, is further input to the interrupt permission circuit. The interrupt permission register can be written/read by the CPU 1 and selects whether to permit or prohibit a corresponding interruption.

When the interrupt cause flag is set to "1" and the interrupt permission bit is set to "1", an interruption is requested. An output from the interrupt permission circuit, which is an interrupt request, is input to the interrupt/DTC evaluation circuit 51.

Further, a content of the DTC permission register (also referred to as a DTER) 52 is input to the interrupt/DTC evaluation circuit 51. When an interruption is requested, the interrupt/DTC evaluation circuit 51 selects whether to start the DTC 3 or allow an interruption to the CPU 1.

When a bit corresponding to the interrupt cause of the DTC permission register 52 is set to "1", the interrupt/DTC evaluation circuit 51 requests the DTC 3 to start and will not request an interruption to the CPU 1. When the bit corresponding to the interrupt cause of the DTC permission register 52 is cleared to "0", the interrupt/DTC evaluation circuit 51 requests an interruption to the CPU 1 and will not request the DTC 3 to start. The interrupt/DTC evaluation circuit 51 outputs a startup request to the priority evaluation circuit 53.

The priority evaluation circuit 53 evaluates priorities of the interrupt request to the CPU 1 and the startup request to the DTC 3 when there are a plurality of interrupt requests. At the time of evaluating the priorities of the startup request to the CPU 1, an evaluation of the mask level can also be performed. The evaluation of the priority of the startup request to CPU 1 is controlled according to a priority register, an interrupt mask level and the like.

The priority evaluation circuit 53 selects the startup request having the highest priority and generates a vector number. When the startup request to the CPU 1 is selected, the priority evaluation circuit 53 generates an interrupt request CPUINT and a vector number CPUVEC of the CPU 1. When the startup request to the DTC 3 is selected, the priority evaluation circuit 53 generates a startup request signal DTCREQ and a vector number DTCVEC of the DTC 3. The startup request signal DTCREQ is input to the DTC 3. The vector number DTCVE is input to the latch circuit 54.

Further, a DTC operation start signal and a DTC operation completion signal are input to the latch circuit 54 from the DTC 3. Specifically, when the DTC 3 starts an operation, the DTC operation start signal is activated, and the latch circuit 54 latches or holds the vector number DTCVEC. When the data transfer by the DTC 3 is completed, the DTC operation completion signal is activated, and the latch by the latch circuit 54 is cancelled.

The vector number DTCVEC and the DTC operation completion signal are input to the decoder circuit 55. Then, a cause clear signal for the corresponding interrupt cause flag is activated, and the corresponding interrupt cause flag or the DTC bit are cleared.

When the DTC 3 is started by a necessary interrupt cause, the CPU 1 writes the data transfer information and the like at a necessary address in advance, and also sets the interrupt permission bit corresponding to the interrupt cause and the DTC bit corresponding to the interrupt cause of the DTC permission register 52 to "1".

When the interrupt cause flag is set to "1", the DTC 3 is started. When the DTC 3 executes a predetermined data transfer, the DTC 3 clears the interrupt cause flag to "0" for every data transfer. At this time, no interruption is requested to the CPU 1.

When the predetermined data transfer is completed, the DTC 3 clears the DTE bit to "0" after the data transfer. At this time, as the interrupt cause flag is held as "1", and the DTE bit is cleared to "0", an interruption is requested to the CPU 1. The CPU 1 executes processing to complete the predetermined data transfer and re-sets the data transfer information and the DTC bit.

Eighth Embodiment

Figure 20:
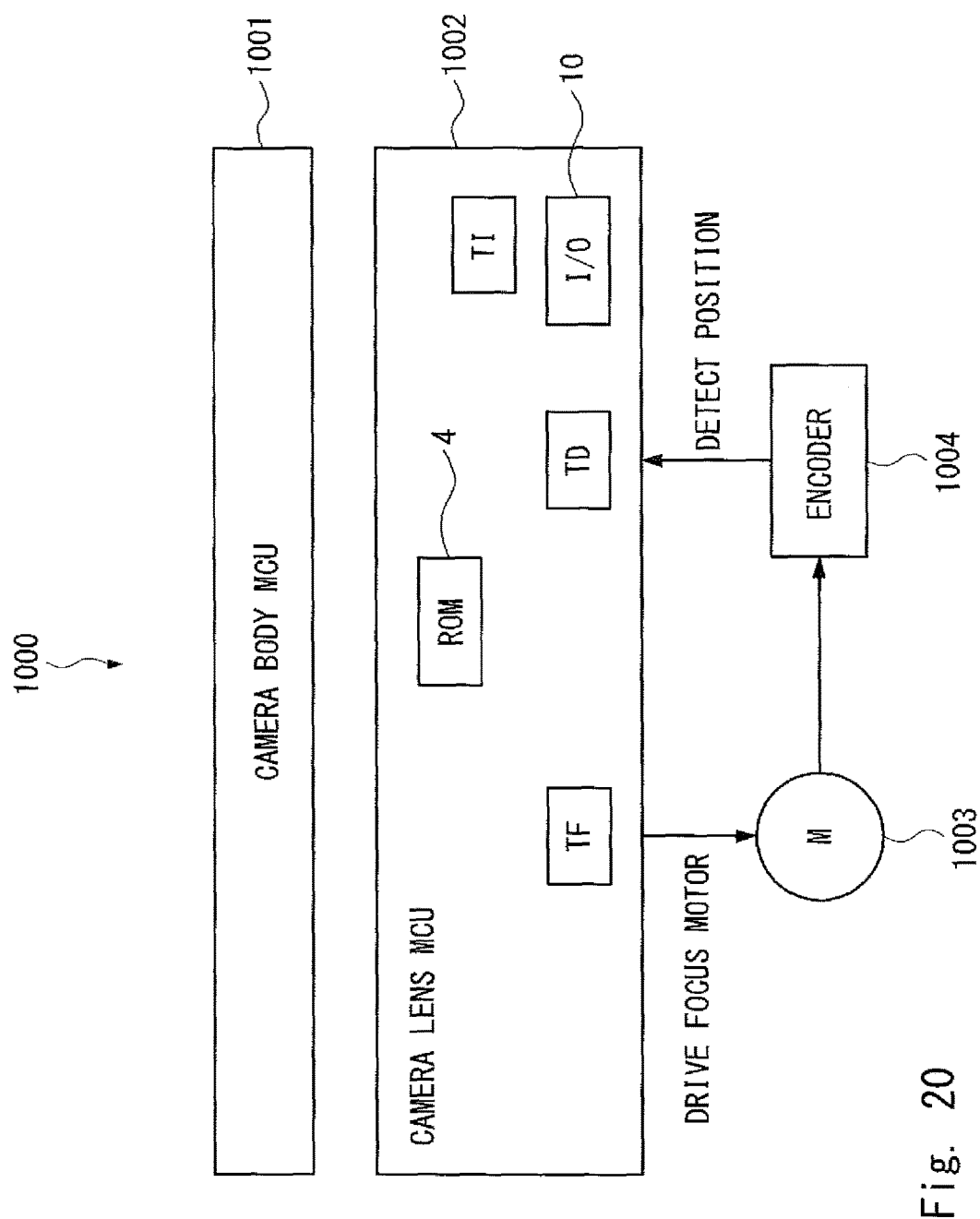
FIG. 20 is a block diagram of a camera system including a microcomputer (MCU).

A microcomputer according to an eighth embodiment shall be explained. In this embodiment, an example in which the above-mentioned MCU is applied to a camera system for controlling a camera shall be explained. FIG. 20 is a block diagram of a camera system 1000 including the MCU.

The camera system 1000 includes a camera body MCU 1001, a camera lens MCU 1002, a focus motor 1003, and an encoder 1004 for detecting a position of the focus motor. Any one of the MCUs that have been explained in the first to seventh embodiments is used as the camera lens MCU 1002.

The camera lens MCU 1002 includes a timer F (also referred to as a TF) for driving the focus motor, a timer D (also referred to as a TD) for an encoder input, and a timer I (also referred to as a TI) having an interval timer function. These timers F, D, and I correspond to the timer 7. A ROM 4 (not shown in the drawing) that stores a table for the focus motor is included in the camera lens MCU 1002. Further, a switch for allowing auto-focus and anti-vibration is input via the input/output port (I/O) 10.

The camera lens MCU 1002 receives a command and data associated with the command via one line of communication means such as a serial communication interface (SCI, corresponding to the communication module 8) from the camera body MCU 1001. The DTC 3 is started by this reception completion interruption.

By setting the table reference mode of the DTC 3 to the branch mode, the command input from the communication means is analyzed, and a necessary data transfer is performed based on the command.

A case when the input command (e.g., the status request command) requests for a reply of a predetermined state of a lens (e.g., a state of an permission switch of image stabilization) shall be explained. In such a case, by transferring a predetermined functional block (e.g., a content of the input/output port (I/O)) of the camera lens MCU 1001 to a transmission data register of the SCI by the data transfer information corresponding to the branch mode, data can be transmitted. Then, by performing the chain operation for the command, the processing by the CPU will be unnecessary, and a necessary operation can be completed immediately.

When the input command is a focusing command, a target position is continuously received. The target position is set to the DR in the proportional mode at the time when a next reception completion interruption occurs, and the DTC is started by the timer I. Then, the table is referred, and necessary focus motor driving can be performed.

When the above-mentioned operation is performed, the CPU 1 can be in a low power consumption state, such as sleep or standby mode. It is thus possible to contribute to reduction in the power consumption of the system. The DTC 3 has a logical size smaller than that of the CPU and can perform processing at a speed higher than the CPU can, thereby improving the effect of reducing the power consumption. For example, in a camera system that is driven by a battery, the reduction in the power consumption is especially important.

In the case of a zoom lens, it may need to change focus motor drive control according to a position of the zoom. In such a case, a plurality of tables are prepared, and a focusing instruction, the target position, and the table which will be used are received from the camera body MCU 1001. In this way, the SAR2 can be set to the address corresponding to the table which will be used.

Note that the present invention is not limited to the above embodiments, and modifications can be made as appropriate without departing from the scope of the invention. For example, although the data transfer information is in the unit of 32 bits in the above embodiments, the data transfer information can be in the unit of any bit. The arrangement of the data transfer information can be arbitrarily changed. Specifically, the number of bits of the address register is not limited to 32 bits but can be changed according to an address space of the CPU or the microcomputer and can be, for example, 24 bits, if it is an address space of 16 M bytes. A bit arrangement of the MR may be divided and combined with 24 bits SAR and DAR. The bit arrangement of the MR may be arbitrary, and the SFM bit, the OFM bit, the PRM bit, the DRM bit, the INM bit, the ERM bit, and the NOP bit may be encoded.

In the above embodiments, although, in the case of the normal data transfer, the SAR2 as the hardware is used as the source address register in the data transfer information, the SAR1 may be used instead of the SAR2. Further, the arrangement other than the transfer mode information included in the data transfer information can be changed arbitrarily. The source address information is desirably disposed so that the source address information can be read prior to the destination address information.

The program operated by the CPU may be disposed in a ROM or an external memory. Similarly, the memory, which is a working area for the CPU, is not limited to the RAM and may be the external memory. Additionally, the microcomputer may not include one or both of the ROM and the RAM.

Although the data transfer information of the DTC, the input data block, and the coefficient data block may better be stored in the RAM included in the microcomputer in terms of a processing speed and power consumption, they may be stored in the external memory.

In the above embodiments, it has been explained that the data transfer information is disposed in a memory such as a RAM. However, the data transfer information can be held in the functional block as an internal I/O register, for example like a so-called DMA controller, and can be disposed in the address space.

In the above embodiments, a method in which the data transfer information is stored in a storage device such as a RAM has been explained. However, although the data transfer information that can be used is limited according to the hardware, the data transfer that has been explained in the above embodiments can be applied to a so-called DMA controller.

Moreover, other data transfer apparatuses such as a DMA controller can be provided in addition to the DTC. Functions of the DTC and the DMA controller can be integrated into one functional module.

Specific circuit configurations of the DTC and the interrupt controller can be modified in various ways with the functions equivalent to the functions explained in the above embodiments. Although details of bus operations such as BSC, bus, and wait have not been explained, these bus operations can be implemented as appropriate. The above-explained configuration of the microcomputer is merely an example, and modifications can be made thereto as appropriate.

Although the microcomputer has been explained in the above embodiments, this is merely an example. The DTC that has been explained in the above-described embodiments can be applied to various apparatuses such as a data processing apparatus and a semiconductor integrated circuit including an arithmetic unit that is independent from the data processing apparatus. For example, the DTC can be applied to a semiconductor integrated circuit apparatus centering around a digital signal processor (DSP). The present invention can be applied to, at least, a data processing apparatus and a semiconductor integrated circuit apparatus including the data transfer apparatus.

Although the invention carried out by the present inventor has been explained in detail based on the embodiments, it is obvious that the present invention is not limited to the above-mentioned embodiments, and various modifications can be made without departing from the scope of the invention.

While the invention has been described in terms of several embodiments, those skilled in the art will recognize that the invention can be practiced with various modifications within the spirit and scope of the appended claims and the invention is not limited to the examples described above.

Further, the scope of the claims is not limited by the embodiments described above.

Furthermore, it is noted that, Applicant's intent is to encompass equivalents of all claim elements, even if amended later during prosecution.

The first and second embodiments can be combined as desirable by one of ordinary skill in the art.

What is claimed is:

1. A semiconductor apparatus comprising:
    a data transfer controller for transferring data from a source address region to a destination address region based on data transfer information in response to a startup request, wherein
    the data transfer controller:
        performs an operation on a second source address information based on data that has been read from a first source address information,
        performs reading based on a result of the operation, and writes read data based on destination address information,
    wherein the data transfer controller specifies data transfer information which will be used in a next data transfer based on the data that has been read based on the result of the operation,
    wherein the data that has been read from the first source address information includes information specifying whether or not to perform a next data transfer operation, and
    wherein the data transfer controller evaluates whether or not to perform the next data transfer operation based on predetermined information that is included in the data that has been read from the first source address information,
    wherein the data transfer controller:
        calculates a deviation between the data that has been read from the first source address information and one of a target value data corresponding to the data that has been read from the first source address information and old data that has been read from the first source address information, and
        performs an operation on the second source address information based on the calculated deviation.

2. The semiconductor apparatus according to claim 1, wherein
    the data transfer controller adds a result of performing one or both of a logical operation and a shift operation on the data that has been read from the first source address information to the second source address information.

3. The semiconductor apparatus according to claim 1, wherein
    the data transfer controller adds a result of performing one or both of a logical operation and a shift operation on a part of the data that has been read from the first source address information to the second source address information.

4. The semiconductor apparatus according to claim 1, wherein
    the data transfer controller performs a calculation on the second source address information based on information that is included in the data transfer information and specifies the calculation by the data transfer controller.

5. The semiconductor apparatus according to claim 4, wherein
    the data transfer controller writes a result obtained by adding the data that has been written by the data transfer controller for each of plurality of different pieces of the data transfer information.

6. The semiconductor apparatus according to claim 1, wherein
    the data transfer controller consecutively performs data transfers in a plurality of transfer modes.

7. The semiconductor apparatus according to claim 1, further comprising:
    a data input and output unit; and
    an interrupt controller,
    wherein
    the data input and output unit issues an interrupt request to the interrupt controller, and
    the interrupt controller outputs a startup request to the data transfer controller in response to the interrupt request.

8. The semiconductor apparatus according to claim 7, further comprising:
    a central processing unit,
    wherein
    the interrupt controller outputs the interrupt request to the central processing unit when the data transfer controller completes the data transfer.

9. The semiconductor apparatus according to claim 8, wherein
    the central processing unit sets the data transfer information.

10. A semiconductor apparatus comprising:
    a data transfer controller for transferring data from a source address region to a destination address region based on data transfer information in response to a startup request, wherein the data transfer controller:

performs an operation on a second source address information based on data that has been read from a first source address information, performs reading based on a result of the operation, and writes read data based on destination address information, wherein the data transfer controller:

calculates a deviation between the data that has been read from the first source address information and one of a target value data corresponding to the data that has been read from the first source address information and old data that has been read from the first source address information, and performs an operation on the second source address information based on the calculated deviation.

11. The semiconductor apparatus according to claim 10, wherein the data transfer controller consecutively performs data transfers in a plurality of transfer modes.

12. A semiconductor apparatus comprising:

a data transfer controller for transferring data from a source address region to a destination address region based on data transfer information in response to a startup request, wherein the data transfer controller:

performs an operation on a second source address information based on data that has been read from a first source address information, performs reading based on a result of the operation, and writes read data based on destination address information, wherein the data transfer controller:

calculates a deviation between the data that has been read from the first source address information and data that is adjacent to the first source address information for a plurality of times while switching the first source address information for a plurality of times, and performs an operation on the second source address information based on a sum of the plurality of calculated deviations.

* * * * *